US012656129B2

(12) United States Patent
Nimura

(10) Patent No.: US 12,656,129 B2
(45) Date of Patent: Jun. 16, 2026

(54) DRIVING ASSISTANCE DEVICE AND COMPUTER PROGRAM

(71) Applicant: AISIN CORPORATION, Kariya (JP)

(72) Inventor: Mitsuhiro Nimura, Kariya (JP)

(73) Assignee: AISIN CORPORATION, Kariya (JP)

( * ) Notice: Subject to any disclaimer, the term of this patent is extended or adjusted under 35 U.S.C. 154(b) by 149 days.

(21) Appl. No.: 18/030,902

(22) PCT Filed: Sep. 7, 2021

(86) PCT No.: PCT/JP2021/032832
§ 371 (c)(1),
(2) Date: Apr. 7, 2023

(87) PCT Pub. No.: WO2022/085320
PCT Pub. Date: Apr. 28, 2022

(65) Prior Publication Data
US 2023/0375347 A1      Nov. 23, 2023

(30) Foreign Application Priority Data
Oct. 23, 2020      (JP) ................................. 2020-177980

(51) Int. Cl.
*G01C 21/34*           (2006.01)
(52) U.S. Cl.
CPC ..... *G01C 21/3423* (2013.01); *G01C 21/3461* (2013.01)
(58) Field of Classification Search
CPC ........................ G01C 21/3423; G01C 21/3461
See application file for complete search history.

(56) References Cited

U.S. PATENT DOCUMENTS

2013/0030702 A1    1/2013  Yamamoto
2016/0133133 A1*   5/2016  Triplett ................. H04W 4/023
340/932.2

(Continued)

FOREIGN PATENT DOCUMENTS

JP            5420079 B2     2/2014
JP         2016042096 A   *  3/2016
JP            6370765 B2     8/2018

OTHER PUBLICATIONS

International Search Report of PCT/JP2021/032832 dated Nov. 22, 2021 [PCT/ISA/210].

(Continued)

*Primary Examiner* — Vivek D Koppikar
*Assistant Examiner* — Jeffrey R Chalhoub
(74) *Attorney, Agent, or Firm* — Sughrue Mion, PLLC

(57)           ABSTRACT
Provided is a driving assistance device/program enabling selection of an appropriate parking space for parking a vehicle. A lane network which is a network representing movement into lanes that can be selected by a vehicle, a parking network which is a network representing a course that can be selected by the vehicle in a parking lot, an after-getting-out-of-vehicle network which is a network representing a course that can be selected by a user with moving means used after getting out of the vehicle are obtained, a moving cost required for movement to a destination, including movement by the vehicle to a parking space in the parking lot and movement from the parking space to the destination by the moving means used after getting out of the vehicle, is calculated using the networks, and a parking space in which the vehicle is parked is selected using the calculated moving cost.

6 Claims, 19 Drawing Sheets

(56)         References Cited

U.S. PATENT DOCUMENTS

2020/0018602  A1      1/2020  Beaurepaire et al.
2020/0307648  A1*  10/2020  Noguchi  ................ G06Q 10/02

OTHER PUBLICATIONS

Extended European Search Report issued May 6, 2024 in European Application No. 21882461.3.

* cited by examiner

Parking lot that does not allow right-turn entry

Parking lot that allows right-turn entry

DRIVING ASSISTANCE DEVICE AND COMPUTER PROGRAM

CROSS REFERENCE TO RELATED APPLICATIONS

This application is a National Stage of International Application No. PCT/JP2021/032832 filed on Sep. 7, 2021, claiming priority based on Japanese Patent Application No. 2020-177980 filed on Oct. 23, 2020, the entire contents of which are incorporated herein by reference.

TECHNICAL FIELD

The present disclosure relates to a driving assistance device and a computer program that provide driving assistance for a vehicle.

BACKGROUND ART

When a vehicle moves to a destination, generally, the vehicle moves to a parking lot belonging to the destination or a parking lot around the destination and is parked, and a user moves on foot, etc., to a point that is the destination from a parking space in the parking lot in which the vehicle is parked, by which the movement is completed. Particularly, when there are a plurality of candidates for a location where the vehicle is parked, a user's burden greatly varies depending on which location the vehicle is parked at, and thus, it has been very important to select an appropriate parking location for parking the vehicle. Hence, for example, JP 5420079 B2 discloses a technique for searching, when there are a plurality of parking lots which are candidates for parking, for a parking lot with the shortest movement course after parking to a store which is a destination, using a floor plan.

CITATIONS LIST

Patent Literature

Patent Literature 1: JP 5420079 B2 (pages 9-11 and FIG. 16)

SUMMARY OF THE DISCLOSURE

Technical Problems

Here, in the above-described Patent Literature 1, a vehicle's parking location is selected taking into account a user's burden associated with movement after getting out of the vehicle. However, the user's burden associated with movement after getting out of the vehicle is not necessarily proportional to a user's burden associated with movement of the vehicle to a parking location and parking. Namely, even if there is a parking location with a small user's burden associated with movement after getting out of the vehicle, if a user's burden associated with movement of the vehicle to the parking location and parking is large, then the parking location is not necessarily an appropriate parking location for the user. Thus, there has been a problem in the above-described Patent Literature 1 that an appropriate parking location for parking the vehicle cannot be selected.

The present disclosure is made to solve the above-described conventional problem, and provides a driving assistance device and a computer program that enable selection of an appropriate parking space for parking a vehicle, by taking into account also a user's burden associated with movement by the vehicle in addition to a user's burden associated with movement after getting out of the vehicle.

Solutions to Problems

To provide the above-described driving assistance device and computer program, a driving assistance device according to the present disclosure includes lane network obtaining means for obtaining a lane network, the lane network being a network representing movement into lanes that can be selected by a vehicle; parking network obtaining means for obtaining a parking network, the parking network being a network representing a course that can be selected by a vehicle in a parking lot; after-getting-out-of-vehicle network obtaining means for obtaining an after-getting-out-of-vehicle network, the after-getting-out-of-vehicle network being a network representing a course that can be selected by a user with moving means used after getting out of a vehicle; cost calculating means for calculating, using the lane network, the parking network, and the after-getting-out-of-vehicle network, a moving cost required for movement to a destination, including movement by a vehicle to a parking space in a parking lot and movement from a parking space to a destination by moving means used after getting out of a vehicle; and parking space selecting means for selecting a parking space in which a vehicle is parked, using the moving cost calculated by the cost calculating means.

In addition, a computer program according to the present disclosure is a program that generates assistance information used for driving assistance provided in a vehicle. Specifically, the computer program causes a computer to function as lane network obtaining means for obtaining a lane network, the lane network being a network representing movement into lanes that can be selected by a vehicle; parking network obtaining means for obtaining a parking network, the parking network being a network representing a course that can be selected by a vehicle in a parking lot; after-getting-out-of-vehicle network obtaining means for obtaining an after-getting-out-of-vehicle network, the after-getting-out-of-vehicle network being a network representing a course that can be selected by a user with moving means used after getting out of a vehicle; cost calculating means for calculating, using the lane network, the parking network, and the after-getting-out-of-vehicle network, a moving cost required for movement to a destination, including movement by a vehicle to a parking space in a parking lot and movement from a parking space to a destination by moving means used after getting out of a vehicle; and parking space selecting means for selecting a parking space in which a vehicle is parked, using the moving cost calculated by the cost calculating means.

Advantageous Effects of Various Aspects of the Disclosure

According to a driving assistance device and a computer program according to the present disclosure that have the above-described configurations, using a lane network, a parking network, and an after-getting-out-of-vehicle network, a moving cost is calculated that is required for movement to a destination, including movement by a vehicle to a parking space in a parking lot and movement from the parking space to the destination by moving means used after getting out of the vehicle, and a parking space in which the vehicle is parked is selected, and thus, by taking into account also a user's burden associated with movement by the vehicle in addition to a user's burden associated with movement after getting out of the vehicle, an appropriate parking space for parking the vehicle can be selected. Then, by providing driving assistance based on the identified parking space, driving assistance can be appropriately provided.

DESCRIPTION OF EMBODIMENTS

One embodiment in which a driving assistance device according to the present disclosure is embodied into a navigation device 1 will be described in detail below with reference to the drawings. First, a schematic configuration of

Figure 1:
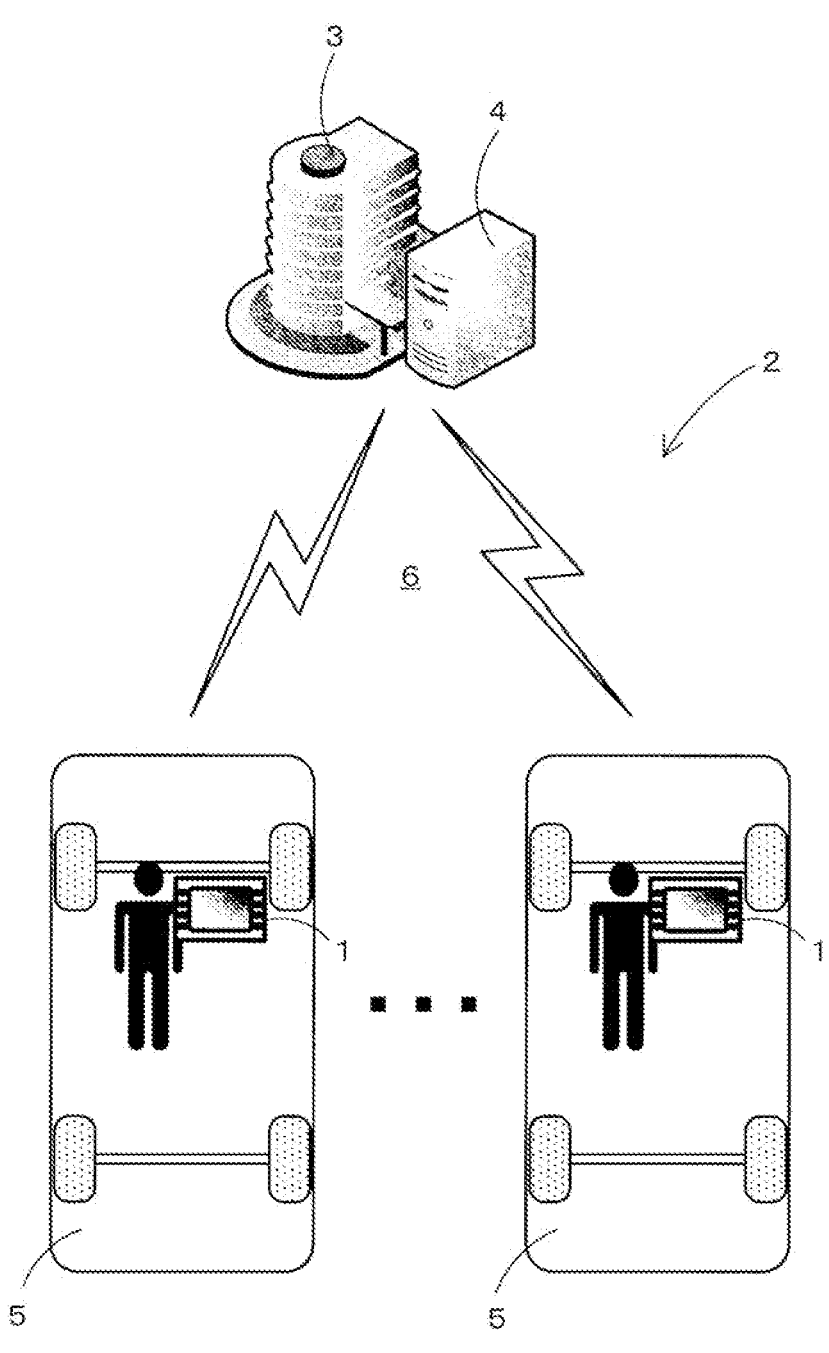
FIG. 1 is a schematic configuration diagram showing a driving assistance system according to the present embodiment.
Figure 2:
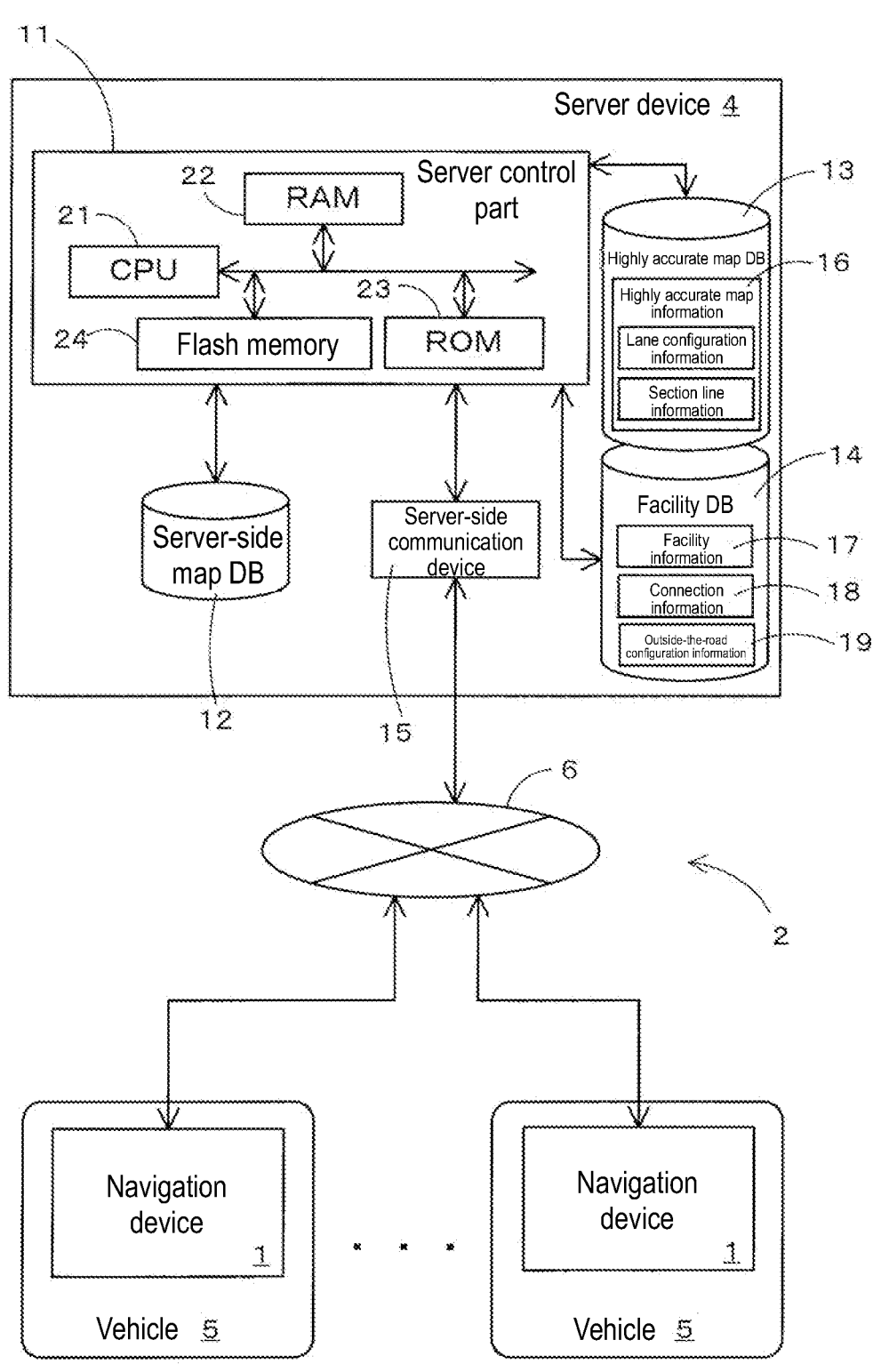
FIG. 2 is a block diagram showing a configuration of the driving assistance system according to the present embodiment.

4 a driving assistance system 2 including navigation devices 1 according to the present embodiment will be described using FIGS. 1 and 2. FIG. 1 is a schematic configuration diagram showing the driving assistance system 2 according to the present embodiment. FIG. 2 is a block diagram showing a configuration of the driving assistance system 2 according to the present embodiment.

As shown in FIG. 1, the driving assistance system 2 according to the present embodiment basically includes a server device 4 provided in an information delivery center 3; and navigation devices 1 each mounted on a vehicle 5 to provide various types of assistance related to autonomous driving of the vehicle 5. In addition, the server device 4 and the navigation devices 1 are configured to be able to perform transmission and reception of electronic data with each other through a communication network 6. Note that instead of the navigation device 1, other in-vehicle devices mounted on the vehicle 5 or a vehicle control device that performs control for the vehicle 5 may be used.

Here, the vehicle 5 is a vehicle that can perform assistance travel by autonomous driving assistance in which the vehicle autonomously travels along a preset course or a road independently of user's driving operations, in addition to manual driving travel in which the vehicle travels based on user's driving operations.

In addition, the configuration may be such that autonomous driving assistance is provided for all road segments or is provided only while the vehicle travels on a specific road segment (e.g., an expressway having a gate (it does not matter whether or not there is a person or whether or not a toll is collected) at a boundary). The following description is made assuming that autonomous driving segments in which autonomous driving assistance for the vehicle is provided include parking lots in addition to all road segments including general roads and expressways, and that autonomous driving assistance is basically provided during a period from when the vehicle starts traveling until the vehicle finishes traveling (until the vehicle is parked). Note, however, that it is desirable that instead of always providing autonomous driving assistance when the vehicle travels on an autonomous driving segment, autonomous driving assistance be provided only in a situation in which a user has selected provision of autonomous driving assistance (e.g., an autonomous driving start button is turned on) and it is determined that travel by autonomous driving assistance can be performed. On the other hand, the vehicle 5 may be a vehicle that can only perform assistance travel by autonomous driving assistance.

In vehicle control performed during autonomous driving assistance, for example, a current location of the vehicle, a lane in which the vehicle travels, and the location of an obstacle around the vehicle are detected whenever necessary, and control of the vehicle, e.g., steering, a drive source, and a brake, is autonomously performed so that the vehicle travels along a travel path generated by the navigation device 1 and at a speed in accordance with a speed plan created likewise, as will be described later. Note that in assistance travel by autonomous driving assistance of the present embodiment, for a lane change, a left or right turn, and a parking operation, too, the vehicle travels by performing the above-described vehicle control by autonomous driving assistance, but the configuration may be such that special travel such as a lane change, a left or right turn, and a parking operation is performed by manual driving instead of performing travel by autonomous driving assistance.

Meanwhile, the navigation device 1 is an in-vehicle device mounted on the vehicle 5 to display a map of an area around the location of the vehicle 5 based on map data provided in the navigation device 1 or map data obtained from an external source, perform input of a user's destination, display a current location of the vehicle on a map image, or provide movement guidance in accordance with a set guidance course. In the present embodiment, particularly, when the vehicle performs assistance travel by autonomous driving assistance, various types of assistance information about the autonomous driving assistance are generated. The assistance information includes, for example, a travel path recommended for the vehicle to travel along (including a recommended way of moving into lanes), a parking space in which the vehicle is parked at a destination, and a speed plan indicating vehicle speed used upon traveling. Note that details of the navigation device 1 will be described later.

In addition, the server device 4 can also perform a course search in response to a request from a navigation device 1. Specifically, information required for a course search such as a point of departure and a destination is transmitted together with a course search request from a navigation device 1 to the server device 4 (note, however, that in a case of re-searching, information about a destination does not necessarily need to be transmitted). Then, the server device 4 having received the course search request performs a course search using map information provided in the server device 4, to identify a recommended course from the point of departure to the destination. Thereafter, the identified recommended course is transmitted to the navigation device 1 which is a source of the request. Then, the navigation device 1 can provide a user with information about the received recommended course, or can also generate, using the recommended course, various types of assistance information about autonomous driving assistance as will be described later.

Furthermore, the server device 4 has highly accurate map information which is map information with a higher degree of accuracy, separately from normal map information used for the above-described course search; and facility information. The highly accurate map information includes, for example, information about the lane configurations of roads (lane-by-lane road configurations, curvatures, lane widths, etc.) and section lines (roadway centerlines, lane boundary lines, roadway outer lines, guidelines, etc.) painted on the roads. In addition to the information, the highly accurate map information also includes, for example, information about intersections. On the other hand, the facility information is more detailed information about facilities that is stored separately from information about facilities included in the map information. The facility information includes, for example, information about a floor plan of a facility and an entrance to a parking lot, layout information of passages and parking spaces provided in the parking lot, information on section lines that mark off the parking spaces, and connection information indicating a connection relationship between the entrance to the parking lot and a lane. The server device 4 delivers highly accurate map information and facility information in response to a request from a navigation device 1, and the navigation device 1 generates various types of assistance information about autonomous driving assistance as will be described later, using the highly accurate map information and facility information delivered from the server device 4. Note that the highly accurate map information is basically map information targeting only roads (links) and areas around the roads, but may be map information that also includes areas other than the areas around the roads.

Note, however, that the above-described course search process does not necessarily need to be performed by the server device 4, and if a navigation device 1 has map information, then the navigation device 1 may perform the course search process. In addition, highly accurate map information and facility information may be provided in advance in the navigation device 1, instead of being delivered from the server device 4.

In addition, the communication network 6 includes multiple base stations disposed all over the country and telecommunications companies that manage and control their base stations, and is formed by connecting the base stations to the telecommunications companies by wire (optical fiber, ISDN, etc.) or wirelessly. Here, the base stations each include a transceiver and an antenna that perform communication with navigation devices 1. While the base station performs radio communication with a telecommunications company, the base station serves as an end of the communication network 6 and plays a role in relaying communication of navigation devices 1 present in an area (cell) in which radio waves from the base station reach, to the server device 4.

Next, a configuration of the server device 4 in the driving assistance system 2 will be described in more detail using FIG. 2. The server device 4 includes, as shown in FIG. 2, a server control part 11, a server-side map DB 12 connected to the server control part 11 and serving as information recording means, a highly accurate map DB 13, a facility DB 14, and a server-side communication device 15.

The server control part 11 is a control unit (an MCU, an MPU, etc.) that performs overall control of the server device 4, and includes a CPU 21 serving as a computing device and a control device; and internal storage devices such as a RAM 22 used as a working memory when the CPU 21 performs various types of arithmetic processing, a ROM 23 having recorded therein a program for control, etc., and a flash memory 24 that stores a program read from the ROM 23. Note that the server control part 11 includes various types of means serving as processing algorithms with an ECU of a navigation device 1 which will be described later.

Meanwhile, the server-side map DB 12 is storage means for storing server-side map information which is the latest version of map information registered based on input data from an external source and input operations. Here, the server-side map information includes a road network and various types of information required for a course search, course guidance, and map display. The server-side map information includes, for example, network data including nodes and links that indicate a road network, link data about roads (links), node data about node points, intersection data about each intersection, point data about points such as facilities, map display data for displaying a map, search data for searching for a course, and retrieval data for retrieving a point.

In addition, the highly accurate map DB 13 is storage means for storing highly accurate map information 16 which is map information with a higher degree of accuracy than the above-described server-side map information. The highly accurate map information 16 is, particularly, map information that stores more detailed information about roads and facilities where vehicles are to travel, and in the present embodiment, the highly accurate map information 16 includes, for example, for roads, information about lane configurations (lane-by-lane road configurations, curvatures, lane widths, etc.) and section lines (roadway centerlines, lane boundary lines, roadway outer lines, guidelines, etc.) painted on the roads. Furthermore, the highly accurate map information 16 records data representing road gradients, cants, banks, merge segments, a location where the number of lanes decreases, a location where road width becomes narrower, railroad crossings, etc., and records: for a corner, data representing the radius of curvature, an intersection, a T-junction, the entry and exit of the corner, etc.; for road attributes, data representing downhill slopes, uphill slopes, etc.; and for road types, data representing general roads such as national highways, prefectural highways, and narrow streets, and toll roads such as national expressways, urban expressways, automobile roads, general toll roads, and toll bridges. Particularly, in the present embodiment, the highly accurate map information 16 also stores information that identifies, in addition to the number of lanes on a road, a passage segment in a traveling direction for each lane and a connection between roads for each lane (specifically, a correspondence between a lane included in a road before passing through an intersection and a lane included in a road after passing through the intersection). Furthermore, the highly accurate map information 16 also stores speed limits set for roads.

On the other hand, the facility DB 14 is storage means for storing more detailed information about facilities than information about facilities stored in the above-described server-side map information. Specifically, as facility information 17, there are included, particularly, for a parking lot that is where to park a vehicle (including both a parking lot provided by a facility and an independent parking lot), information that identifies the location of an entrance/exit of the parking lot, information that identifies a layout of parking spaces in the parking lot, information about section lines that mark off the parking spaces, and information about passages through which vehicles and pedestrians can pass. For a facility other than parking lots, there is included information that identifies a floor plan of the facility. The floor plan includes, for example, information that identifies the locations of entrances and exits, passages, stairs, elevators, and escalators. In addition, for a complex commercial facility including a plurality of tenants, there is included information that identifies the location of each tenant that occupies the complex commercial facility. The facility information 17 may be, particularly, information generated by 3D modeling of a parking lot or a facility. Furthermore, the facility DB 14 also includes connection information 18 indicating a connection relationship between a lane included in an entry road facing an entrance to a parking lot and the entrance to the parking lot; and outside-the-road configuration information 19 that identifies a region between the entry road and the entrance to the parking lot through which vehicles can pass. Details of each piece of information stored in the facility DB 14 will be described later.

Note that the highly accurate map information 16 is basically map information targeting only roads (links) and areas around the roads, but may be map information that also includes areas other than the areas around the roads. In addition, although in the example shown in FIG. 2, server-side map information stored in the server-side map DB 12 and information stored in the highly accurate map DB 13 and the facility DB 14 are different pieces of map information, the information stored in the highly accurate map DB 13 and the facility DB 14 may be a part of the server-side map information. In addition, the highly accurate map DB 13 and the facility DB 14 may be a single database instead of being separated from each other.

Meanwhile, the server-side communication device 15 is a communication device for performing communication with the navigation device 1 of each vehicle 5 through the communication network 6. In addition, besides the navigation devices 1, it is also possible to receive traffic information including pieces of information such as congestion information, regulation information, and traffic accident information that are transmitted from an Internet network, traffic information centers, e.g., a VICS (registered trademark: Vehicle Information and Communication System) center, etc.

Figure 3:
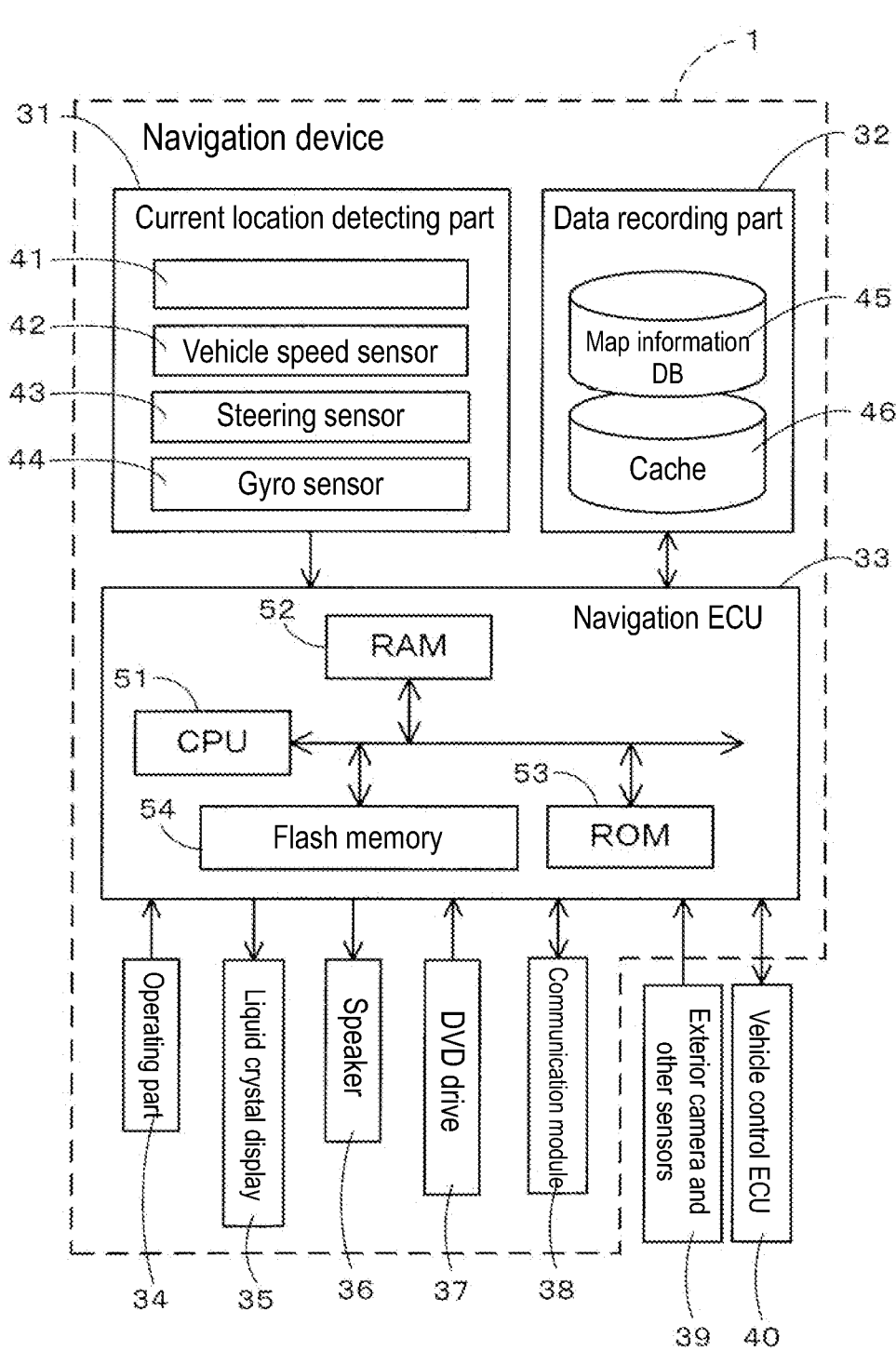
FIG. 3 is a block diagram showing a navigation device according to the present embodiment.

Next, a schematic configuration of a navigation device 1 mounted on a vehicle 5 will be described using FIG. 3. FIG. 3 is a block diagram showing the navigation device 1 according to the present embodiment.

As shown in FIG. 3, the navigation device 1 according to the present embodiment includes a current location detecting part 31 that detects a current location of the vehicle having the navigation device 1 mounted thereon; a data recording part 32 having various types of data recorded therein; a navigation ECU 33 that performs various types of arithmetic processing based on inputted information; an operating part 34 that accepts operations from a user; a liquid crystal display 35 that displays to the user, for example, a map of an area around the vehicle and information about a guidance course (a planned travel course of the vehicle) set on the navigation device 1; a speaker 36 that outputs voice guidance about course guidance; a DVD drive 37 that reads a DVD which is a storage medium; and a communication module 38 that performs communication with information centers such as a probe center and a VICS center. In addition, an exterior camera 39 and various types of sensors that are installed on the vehicle having the navigation device 1 mounted thereon are connected to the navigation device 1 through an in-vehicle network such as a CAN. Furthermore, the navigation device 1 is also connected to a vehicle control ECU 40 in a two-way communicatable manner that performs various types of control on the vehicle having the navigation device 1 mounted thereon.

The components included in the navigation device 1 will be described in turn below.

The current location detecting part 31 includes a GPS 41, a vehicle speed sensor 42, a steering sensor 43, a gyro sensor 44, etc., and can detect the current vehicle location and orientation, a travel speed of the vehicle, a current time, etc. Here, particularly, the vehicle speed sensor 42 is a sensor for detecting the moving distance and vehicle speed of the vehicle, and generates pulses according to the rotation of drive wheels of the vehicle and outputs a pulse signal to the navigation ECU 33. Then, the navigation ECU 33 calculates the rotational speed of the drive wheels and a moving distance by counting the generated pulses. Note that the navigation device 1 does not need to include all of the above-described four types of sensors, and may be configured to include only one or a plurality of types of sensors among those sensors.

In addition, the data recording part 32 includes a hard disk (not shown) serving as an external storage device and a recording medium; and a recording head (not shown) which is a driver for reading a map information DB 45 recorded on the hard disk, a cache 46, a predetermined program, etc., and for writing predetermined data to the hard disk. Note that the data recording part 32 may include a flash memory, a memory card, or an optical disc such as a CD or a DVD, instead of a hard disk. In addition, in the present embodiment, as described above, the server device 4 searches for a course to a destination, and thus, the map information DB 45 may be omitted. Even when the map information DB 45 is omitted, map information can be obtained from the server device 4 as necessary.

Here, the map information DB 45 is storage means having stored therein, for example, link data about roads (links), node data about node points, search data used in processes related to a course search or change, facility data about facilities, map display data for displaying a map, intersection data about each intersection, and retrieval data for retrieving a point.

On the other hand, the cache 46 is storage means for saving highly accurate map information 16, facility information 17, connection information 18, and outside-the-road configuration information 19 that have been delivered from the server device 4 in the past. A saving period can be set as appropriate, and may be, for example, a predetermined period (e.g., one month) after storage or a period until an ACC power supply (accessory power supply) of the vehicle is turned off. In addition, after the amount of data stored in the cache 46 reaches an upper limit, the data may be sequentially deleted in order of oldest to newest. Then, the navigation ECU 33 generates various types of assistance information about autonomous driving assistance, using the highly accurate map information 16, facility information 17, connection information 18, and outside-the-road configuration information 19 stored in the cache 46. Details will be described later.

Meanwhile, the navigation ECU (electronic control unit) 33 is an electronic control unit that performs overall control of the navigation device 1, and includes a CPU 51 serving as a computing device and a control device; and internal storage devices such as a RAM 52 that is used as a working memory when the CPU 51 performs various types of arithmetic processing and that stores course data obtained when a course is searched, etc., a ROM 53 having recorded therein a program for control, an autonomous driving assistance program (see FIG. 4) which will be described later, etc., and a flash memory 54 that stores a program read from the ROM 53. Note that the navigation ECU 33 includes various types of means serving as processing algorithms. For example, lane network obtaining means obtains a lane network which is a network representing movement into lanes that can be selected by the vehicle. Parking network obtaining means obtains a parking network which is a network representing a course that can be selected by the vehicle in a parking lot. After-getting-out-of-vehicle network obtaining means obtains an after-getting-out-of-vehicle network which is a network representing a course that can be selected by the user with moving means used after getting out of the vehicle. Cost calculating means calculates, using the lane network, the parking network, and the after-getting-out-of-vehicle network, a moving cost required for movement to a destination, including movement by the vehicle to a parking space in the parking lot and movement from the parking space to the destination by the moving means used after getting out of the vehicle. Parking space selecting means selects a parking space in which the vehicle is parked, using the moving cost calculated by the cost calculating means.

The operating part 34 is operated, for example, upon inputting a point of departure which is a travel start point and a destination which is a travel end point, and includes a plurality of operating switches such as various types of keys and buttons (not shown). Based on a switch signal outputted by, for example, depression of a given switch, the navigation ECU 33 performs control to perform a corresponding one of various types of operation. Note that the operating part 34 may include a touch panel provided on the front of the liquid crystal display 35. Note also that the operating part 34 may include a microphone and a voice recognition device.

In addition, on the liquid crystal display 35 there are displayed a map image including roads, traffic information, operation guidance, an operation menu, guidance on keys, guidance information in accordance with a guidance course (planned travel course), news, weather forecasts, time, e-mails, TV programs, etc. Note that instead of the liquid crystal display 35, a HUD or an HMD may be used.

In addition, the speaker 36 outputs voice guidance that provides guidance on travel along a guidance course (planned travel course) or guidance on traffic information, based on an instruction from the navigation ECU 33.

In addition, the DVD drive 37 is a drive that can read data recorded on a recording medium such as a DVD or a CD. Based on the read data, for example, music or video is played back or the map information DB 45 is updated. Note that instead of the DVD drive 37, a card slot for performing reading and writing on a memory card may be provided.

In addition, the communication module 38 is a communication device for receiving traffic information, probe information, weather information, etc., that are transmitted from traffic information centers, e.g., a VICS center and a probe center, and corresponds, for example, to a mobile phone or a DCM. In addition, the communication module 38 also includes a vehicle-to-vehicle communication device that performs communication between vehicles and a road-to-vehicle communication device that performs communication with a road-side device. In addition, the communication module 38 is also used to transmit and receive course information searched by the server device 4, highly accurate map information 16, facility information 17, connection information 18, and outside-the-road configuration information 19 to/from the server device 4.

In addition, the exterior camera 39 includes, for example, a camera that uses a solid-state imaging device such as a CCD, and is attached to the upper side of a front bumper of the vehicle and is placed such that an optical-axis direction faces downward at a predetermined angle relative to the horizontal. When the vehicle travels on an autonomous driving segment, the exterior camera 39 captures an image of an area ahead in a traveling direction of the vehicle. In addition, the navigation ECU 33 detects section lines painted on a road on which the vehicle travels, and obstacles such as other vehicles around the vehicle by performing image processing on the captured image having been captured, and generates various types of assistance information about autonomous driving assistance, based on results of the detection. For example, when an obstacle is detected, a new travel path along which the vehicle travels avoiding or following the obstacle is generated. Note that the exterior camera 39 may be configured to be disposed on the rear or side of the vehicle other than the front. Note also that for means for detecting obstacles, a sensor such as millimeter-wave radar or a laser sensor, vehicle-to-vehicle communication, or road-to-vehicle communication may be used instead of a camera.

In addition, the vehicle control ECU 40 is an electronic control unit that controls the vehicle having the navigation device 1 mounted thereon. In addition, driving parts of the vehicle such as steering, a brake, and an accelerator are connected to the vehicle control ECU 40, and in the present embodiment, particularly, after the vehicle starts autonomous driving assistance, each driving part is controlled, by which autonomous driving assistance for the vehicle is provided. In addition, when an override is performed by the user during autonomous driving assistance, the fact that the override is performed is detected.

Here, the navigation ECU 33 transmits various types of assistance information about autonomous driving assistance generated by the navigation device 1 to the vehicle control ECU 40 through the CAN after starting traveling. Then, the vehicle control ECU 40 provides autonomous driving assistance to be provided after starting traveling, using the received various types of assistance information. The assistance information includes, for example, a travel path recommended for the vehicle to travel along and a speed plan indicating vehicle speed used upon traveling.

Figure 4:
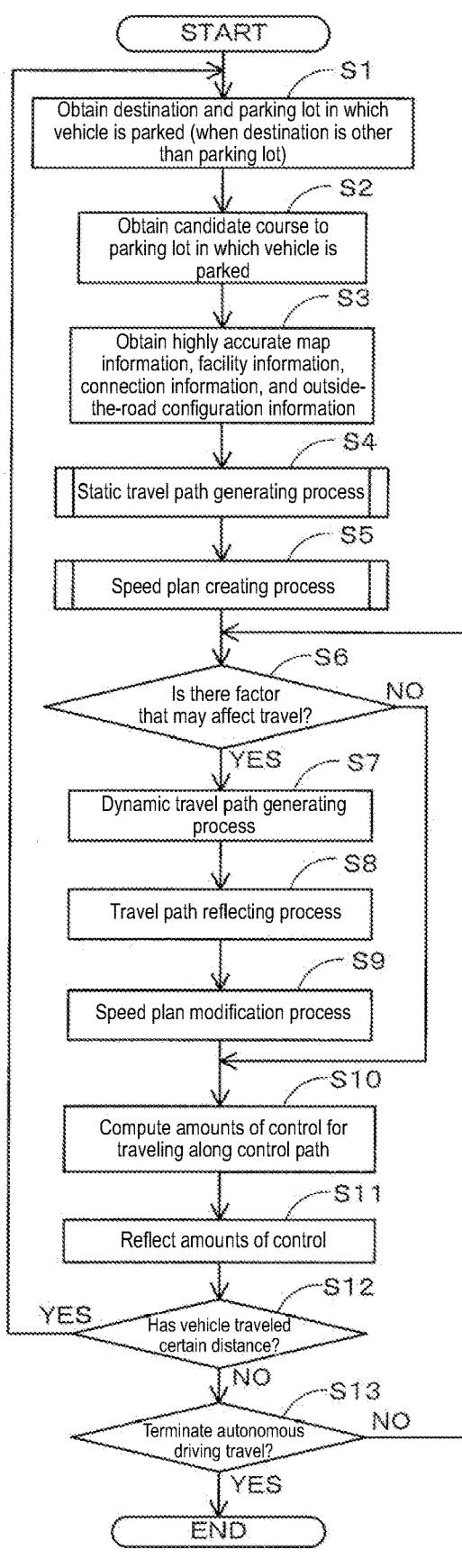
FIG. 4 is a flowchart of an autonomous driving assistance program according to the present embodiment.
Figure 7:
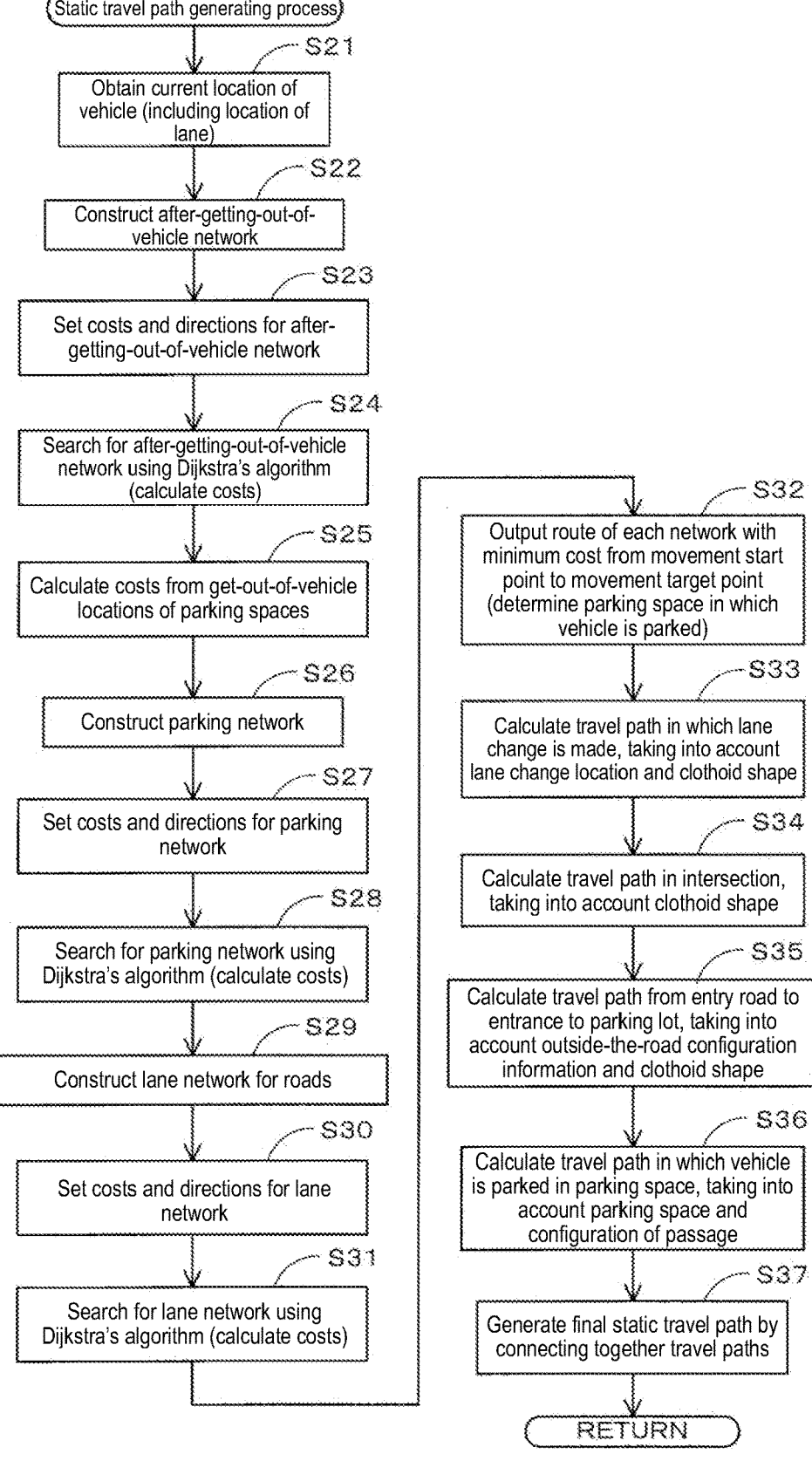
FIG. 7 is a flowchart of a subprocess program of a static travel path generating process.
Figure 22:
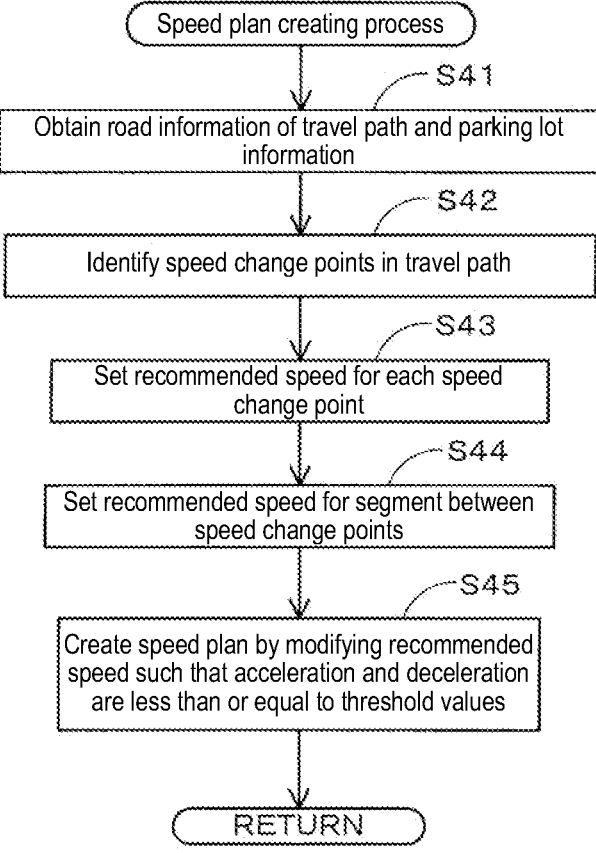
FIG. 22 is a flowchart of a subprocess program of a speed plan creating process.

Next, an autonomous driving assistance program executed by the CPU 51 of the navigation device 1 according to the present embodiment that has the above-described configuration will be described based on FIG. 4. FIG. 4 is a flowchart of an autonomous driving assistance program according to the present embodiment. Here, the autonomous driving assistance program is a program that is executed after the ACC power supply (accessory power supply) of the vehicle is turned on and when travel of the vehicle by autonomous driving assistance has started, and that performs assistance travel by autonomous driving assistance in accordance with assistance information generated by the navigation device 1. In addition, the program shown in flowcharts of the following FIGS. 4, 7, and 22 is stored in the RAM 52 or the ROM 53 included in the navigation device 1, and is executed by the CPU 51.

First, in the autonomous driving assistance program, at step (hereinafter, abbreviated as S) 1, the CPU 51 obtains a destination of the vehicle. Basically, the destination is set by a user's operation accepted by the navigation device 1. Note that the destination may be a parking lot or may be a point other than a parking lot. Note, however, that when the destination is a point other than a parking lot, a parking lot in which the user parks the vehicle at the destination is also obtained. When the destination has a dedicated parking lot or an associated parking lot, the parking lot is considered to be a parking lot in which the user parks the vehicle. On the other hand, when there is no dedicated parking lot or associated parking lot, a parking lot present around the destination is considered to be a parking lot in which the user parks the vehicle. Note that when there are a plurality of candidate parking lots, all candidate parking lots may be obtained as a parking lot in which the user parks the vehicle, or any one of the parking lots selected by the user may be obtained as a parking lot in which the user parks the vehicle.

Then, at S2, the CPU 51 obtains a course serving as a candidate for the vehicle to reach the parking lot in which the user parks the vehicle from a current location of the vehicle (hereinafter, referred to as candidate course). It is desirable to obtain a plurality of candidate courses. Particularly, it is desirable to include candidate courses having different traveling directions upon reaching the parking lot. In addition, for a large parking lot with a plurality of entrances to the parking lot, it is desirable to obtain a plurality of candidate courses that reach each entrance.

In addition, in the present embodiment, the above-described candidate course is searched by, particularly, the server device 4. When a candidate course is searched, first, the CPU 51 transmits a course search request to the server device 4. Note that the course search request includes a terminal ID that identifies the navigation device 1 which is a sender of the course search request; and information that identifies a point of departure (e.g., a current location of the vehicle) and a parking lot in which the user parks the vehicle (when an entrance to the parking lot can be identified, the entrance to the parking lot). Thereafter, the CPU 51 receives searched-course information transmitted from the server device 4 in response to the course search request. The searched-course information is information that identifies a candidate course (e.g., a series of links included in the candidate course) for the vehicle to reach the parking lot in which the user parks the vehicle from the point of departure, the candidate course being searched by the server device 4 using the latest version of map information and based on the transmitted course search request. The search is performed using, for example, the publicly known Dijkstra's algorithm. Note, however, that a candidate course may be searched by the navigation device 1 instead of the server device 4.

Then, at S3, the CPU 51 obtains highly accurate map information 16, targeting an area including the candidate course obtained at the above-described S2.

Figure 5:
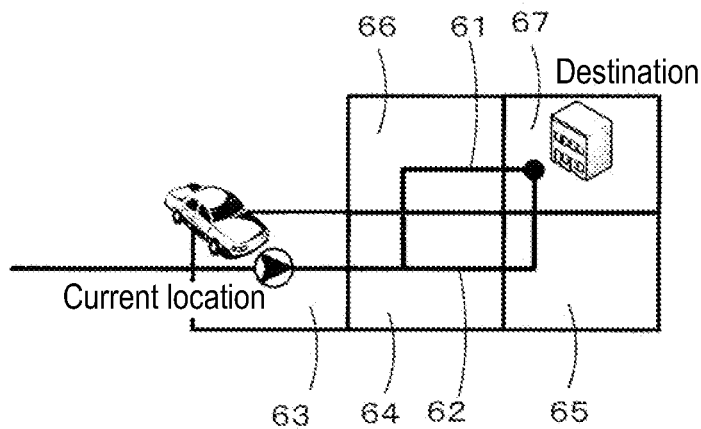
FIG. 5 is a diagram showing an area for which highly accurate map information is obtained.

Here, the highly accurate map information 16 is, as shown in FIG. 5, sectioned into rectangular shapes (e.g., 500 m×1 km) and stored in the highly accurate map DB 13 of the server device 4. Thus, for example, when there are a course 61 and a course 62 as candidate courses as shown in FIG. 5, highly accurate map information 16 is obtained targeting areas 63 to 67 including the course 61 and the course 62. Note, however, that when a distance to a parking lot in which the user parks the vehicle is particularly far, for example, highly accurate map information 16 may be obtained targeting only a secondary mesh in which the vehicle is currently located, or highly accurate map information 16 may be obtained targeting only an area within a predetermined distance (e.g., within 3 km) from a current location of the vehicle.

The highly accurate map information 16 includes, for example, information about the lane configurations of roads and section lines (roadway centerlines, lane boundary lines, roadway outer lines, guidelines, etc.) painted on the roads. In addition to the information, there are also included, for example, information about intersections and information about parking lots. The highly accurate map information 16 is basically obtained in the above-described units of area in rectangular shape from the server device 4, but when the cache 46 has highly accurate map information 16 for areas that is already stored therein, the highly accurate map information 16 is obtained from the cache 46. In addition, the highly accurate map information 16 obtained from the server device 4 is temporarily stored in the cache 46.

In addition, at the above-described S3, the CPU 51 also obtains facility information 17, targeting the destination and the parking lot in which the user parks the vehicle. Furthermore, the CPU 51 likewise obtains connection information 18 indicating a connection relationship between a lane included in an entry road facing an entrance to the parking lot in which the user parks the vehicle and the entrance to the parking lot, and outside-the-road configuration information 19 that identifies a region through which the vehicle can pass between the entry road and the entrance to the parking lot in which the user parks the vehicle.

The facility information 17 includes, for example, information that identifies the location of an entrance/exit of the parking lot, information that identifies a layout of parking spaces in the parking lot, information about section lines that mark off the parking spaces, and information about passages through which vehicles and pedestrians can pass. For a facility other than parking lots, there is included information that identifies a floor plan of the facility. The floor plan includes, for example, information that identifies the locations of entrances and exits, passages, stairs, elevators, and escalators. In addition, for a complex commercial facility including a plurality of tenants, there is included information that identifies the location of each tenant that occupies the complex commercial facility. The facility information 17 may be, particularly, information generated by 3D modeling of a parking lot or a facility. In addition, the facility information 17, the connection information 18, and the outside-the-road configuration information 19 are basically obtained from the server device 4, but when corresponding information is already stored in the cache 46, the information is obtained from the cache 46. In addition, the facility information 17, connection information 18, and outside-the-road configuration information 19 obtained from the server device 4 are temporarily stored in the cache 46.

Thereafter, at S4, the CPU 51 performs a static travel path generating process (FIG. 7) which will be described later. Here, the static travel path generating process is a process of selecting a recommended parking space for parking the vehicle at the destination and further generating a static travel path which is a travel path to the selected parking space recommended for the vehicle to travel along, based on a current location of the vehicle, the parking lot in which the user parks the vehicle, and the highly accurate map information 16, facility information 17, connection information 18, and outside-the-road configuration information 19 obtained at the above-described S2. Note that the static travel path includes, as will be described later, a first travel path recommended for the vehicle to travel along in lanes from a travel start point to the entry road facing the entrance to the parking lot, a second travel path recommended for the vehicle to travel along from the entry road to the entrance to the parking lot, and a third travel path recommended for the vehicle to travel along from the entrance to the parking lot to the parking space in which the vehicle is parked. Note, however, that when a distance to the parking lot in which the user parks the vehicle is particularly far, only a first travel path may be generated targeting a segment from a current location of the vehicle to a location a predetermined distance ahead in a traveling direction (e.g., within a secondary mesh in which the vehicle is currently located). Note that the predetermined distance can be changed as appropriate, but a static travel path is generated targeting a region including at least the outside of an area (detection area) in which road conditions around the vehicle can be detected using the exterior camera 39 and other sensors.

Then, at S5, the CPU 51 performs a speed plan creating process (FIG. 22) which will be described later. In the speed plan creating process, a speed plan for the vehicle that is used upon traveling along the static travel path generated at the above-described S4 is created based on the highly accurate map information 16, facility information 17, connection information 18, and outside-the-road configuration information 19 obtained at the above-described S3. For example, a travel speed of the vehicle recommended upon traveling along the static travel path is calculated taking into account speed limit information and speed change points (e.g., the entrance to the parking lot, intersections, curves, railroad crossings, or crosswalks) present in the static travel path.

Then, the static travel path generated at the above-described S4 and the speed plan created at the above-described S5 are stored in the flash memory 54, etc., as assistance information used for autonomous driving assistance. In addition, an acceleration plan indicating acceleration and deceleration of the vehicle required to implement the speed plan created at the above-described S5 may also be created as assistance information used for autonomous driving assistance.

Subsequently, at S6, the CPU 51 determines, as surrounding road conditions, particularly, whether a factor that affects travel of the vehicle is present around the vehicle, by performing image processing on a captured image having been captured with the exterior camera 39. Here, the "factor that affects travel of the vehicle" to be determined at the above-described S6 is a dynamic factor that changes in real time, and static factors based on road structures are excluded. The factor that affects travel of the vehicle corresponds, for example, to another vehicle that travels or is parked ahead in a traveling direction of the vehicle, a pedestrian located ahead in the traveling direction of the vehicle, or a construction segment present ahead in the traveling direction of the vehicle. On the other hand, intersections, curves, railroad crossings, merge segments, lane reduction segments, etc., are excluded. In addition, even when there is another vehicle, a pedestrian, or a construction segment, if there is no possibility of them overlapping a future travel path of the vehicle (e.g., if they are located away from the future travel path of the vehicle), then they are excluded from the "factor that affects travel of the vehicle". In addition, for means for detecting a factor that may affect travel of the vehicle, a sensor such as millimeter-wave radar or a laser sensor, vehicle-to-vehicle communication, or road-to-vehicle communication may be used instead of a camera.

Then, if it is determined that a factor that affects travel of the vehicle is present around the vehicle (S6: YES), then processing transitions to S7. On the other hand, if it is determined that a factor that affects travel of the vehicle is not present around the vehicle (S6: NO), then processing transitions to S10.

Figure 6:
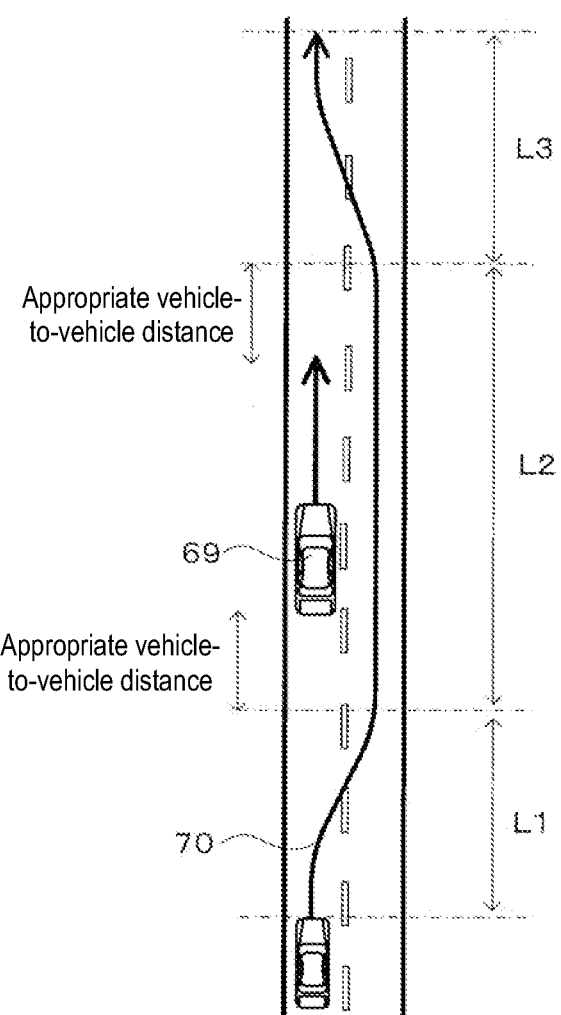
FIG. 6 is a diagram describing a method of calculating a dynamic travel path.

At S7, the CPU 51 generates, as a dynamic travel path, a new path from a current location of the vehicle for avoiding or following the "factor that affects travel of the vehicle" detected at the above-described S6, and returning to the static travel path. Note that the dynamic travel path is generated targeting a segment including the "factor that affects travel of the vehicle". Note also that the length of the segment varies depending on what the factor is. For example, when the "factor that affects travel of the vehicle" is another vehicle traveling ahead of the vehicle (vehicle ahead), as shown in FIG. 6, an avoidance path which is a path in which the vehicle passes a vehicle ahead 69 by making a lane change to the right and then makes a lane change to the left to return to an original lane is generated as a dynamic travel path 70. Note that a following path which is a path in which the vehicle travels following the vehicle ahead 69 from behind at a predetermined distance without passing the vehicle ahead 69 (or travels side by side with the vehicle ahead 69) may be generated as a dynamic travel path.

A method of calculating the dynamic travel path 70 shown in FIG. 6 will be described as an example. The CPU 51 first calculates a first path L1 required for the vehicle to move into a right lane by starting a turn of the steering and for the steering position to return to a straight-ahead direction. Note that the first path L1 is calculated using a clothoid curve so as to be as smooth as possible and to have the shortest possible distance required for a lane change, on conditions that lateral acceleration (lateral G) occurring upon making a lane change does not interfere with autonomous driving assistance and does not exceed an upper limit value (e.g., 0.2 G) at which a passenger of the vehicle is not given discomfort, the lateral G being calculated based on the current vehicle speed of the vehicle. In addition, maintaining an appropriate vehicle-to-vehicle distance or more with the vehicle ahead 69 is also a condition.

Then, a second path L2 is calculated in which the vehicle travels in the right lane with a speed limit being an upper limit, to pass the vehicle ahead 69 and travels until an appropriate vehicle-to-vehicle distance or more with the vehicle ahead 69 is obtained. Note that the second path L2 is basically a straight path, and the length of the path is calculated based on the vehicle speed of the vehicle ahead 69 and the speed limit for the road.

Subsequently, a third path L3 is calculated that is required for the vehicle to return to the left lane by starting a turn of the steering and for the steering position to return to the straight-ahead direction. Note that the third path L3 is calculated using a clothoid curve so as to be as smooth as possible and to have the shortest possible distance required for a lane change, on conditions that lateral acceleration (lateral G) occurring upon making a lane change does not interfere with autonomous driving assistance and does not exceed an upper limit value (e.g., 0.2 G) at which a passenger of the vehicle is not given discomfort, the lateral G being calculated based on the current vehicle speed of the vehicle. In addition, maintaining an appropriate vehicle-to-vehicle distance or more with the vehicle ahead 69 is also a condition.

Note that a dynamic travel path is generated based on road conditions around the vehicle that are obtained using the exterior camera 39 and other sensors, and thus, a region for which a dynamic travel path is to be generated is at least within an area (detection area) for which road conditions around the vehicle can be detected using the exterior camera 39 and other sensors.

Subsequently, at S8, the CPU 51 reflects the dynamic travel path that is newly generated at the above-described S7 in the static travel path generated at the above-described S4. Specifically, a cost of each of the static travel path and the dynamic travel path is calculated for an area from a current location of the vehicle to the end of a segment including the "factor that affects travel of the vehicle", and a travel path with a minimum cost is selected. Consequently, a part of the static travel path is replaced by the dynamic travel path as necessary. Note that depending on the situation, the dynamic travel path may not be replaced, i.e., even when the dynamic travel path is reflected, there may be no change in the static travel path generated at the above-described S4. Furthermore, when the dynamic travel path and the static travel path are identical paths, even when replacement is performed, there may be no change in the static travel path generated at the above-described S4.

Then, at S9, the CPU 51 modifies, for a portion of the static travel path in which the dynamic travel path has been reflected at the above-described S8, the speed plan for the vehicle created at the above-described S5, based on a change made by the reflected dynamic travel path. Note that when there is no change in the static travel path generated at the above-described S4 as a result of reflecting the dynamic travel path, the process at S9 may be omitted.

Subsequently, at S10, the CPU 51 computes the amounts of control for the vehicle to travel along the static travel path generated at the above-described S4 (when the dynamic travel path is reflected at the above-described S8, a path obtained after the reflection) at a speed in accordance with the speed plan created at the above-described S5 (when the speed plan is modified at the above-described S9, a plan obtained after the modification). Specifically, each of the amounts of control for an accelerator, a brake, a gear, and steering is computed. Note that the processes at S10 and S11 may be performed by the vehicle control ECU 40 that controls the vehicle, instead of the navigation device 1.

Thereafter, at S11, the CPU 51 reflects the amounts of control computed at S10. Specifically, the computed amounts of control are transmitted to the vehicle control ECU 40 through the CAN. The vehicle control ECU 40 performs vehicle control on each of the accelerator, the brake, the gear, and the steering based on the received amounts of control. As a result, it becomes possible to perform travel assistance control for traveling along the static travel path generated at the above-described S4 (when the dynamic travel path is reflected at the above-described S8, a path obtained after the reflection) at a speed in accordance with the speed plan created at the above-described S5 (when the speed plan is modified at the above-described S9, a plan obtained after the modification).

Then, at S12, the CPU 51 determines whether the vehicle has traveled a certain distance since the generation of a static travel path at the above-described S4. For example, the certain distance is 1 km.

Then, if it is determined that the vehicle has traveled a certain distance since the generation of a static travel path at the above-described S4 (S12: YES), then processing returns to S1. Thereafter, generation of a static travel path and creation of a speed plan are performed again based on a current location of the vehicle at the present time (S1 to S5). Note that, in the present embodiment, every time the vehicle has traveled a certain distance (e.g., 1 km), generation of a static travel path and creation of a speed plan are repeatedly performed based on a current location of the vehicle, but generation of a static travel path to the destination and creation of a speed plan may be performed only once at the time of starting traveling.

On the other hand, if it is determined that the vehicle has not traveled a certain distance since the generation of a static travel path at the above-described S4 (S12: NO), then it is determined whether to terminate the assistance travel by autonomous driving assistance (S13). A case of terminating the assistance travel by autonomous driving assistance includes a case in which the travel by autonomous driving assistance is intentionally canceled (override) by the user operating an operation panel provided on the vehicle or performing a steering wheel operation, a brake operation, etc., in addition to a case in which parking into the parking lot is completed.

Then, if it is determined to terminate the assistance travel by autonomous driving assistance (S13: YES), then the autonomous driving assistance program is terminated. On the other hand, if it is determined to continue the assistance travel by autonomous driving assistance (S13: NO), then processing returns to S6.

Next, a subprocess of the static travel path generating process performed at the above-described S4 will be described based on FIG. 7. FIG. 7 is a flowchart of a subprocess program of the static travel path generating process.

First, at S21, the CPU 51 obtains a current location of the vehicle detected by the current location detecting part 31. Note that it is desirable to specifically identify the current location of the vehicle using, for example, highly accurate GPS information or a highly accurate location technique. Here, the highly accurate location technique is a technique for enabling detection of a travel lane and a highly accurate vehicle location by detecting, by image recognition, white lines and pavement painting information that are captured with a camera installed on the vehicle, and further checking the detected white lines and pavement painting information against, for example, the highly accurate map information 16. Furthermore, when the vehicle travels on a road having a plurality of lanes, a lane in which the vehicle travels is also identified.

Then, at S22, the CPU 51 constructs, based on the facility information 17 obtained at the above-described S3, an after-getting-out-of-vehicle network, targeting a segment in which the user moves from the parking lot in which the user parks the vehicle to the destination, using moving means (e.g., on foot or a wheelchair) after getting out of the vehicle. Here, the segment for which an after-getting-out-of-vehicle network is constructed is a segment in which the user moves to the destination after getting out of the vehicle, and thus, particularly, when the destination is a tenant in a complex commercial facility including a plurality of tenants, an after-getting-out-of-vehicle network is constructed for a segment also including the inside of a building of the complex commercial facility including the tenant which is the destination. On the other hand, when the destination is not a complex commercial facility, an entrance to a facility is the destination, and thus, basically, the inside of a building of the facility which is the destination is excluded from a target for construction of an after-getting-out-of-vehicle network. In addition, when a facility which is the destination is away from the parking lot in which the vehicle is parked and the user needs to move, after parking, on foot on a road outside the parking lot, an after-getting-out-of-vehicle network is also likewise constructed for the road between the parking lot and the facility.

The facility information 17 obtained at the above-described S3 includes information that identifies a floor plan of a facility, in addition to information about the parking lot. The floor plan includes, for example, information that identifies regions through which pedestrians can pass, such as the locations of entrances and exits, passages, stairs, elevators, and escalators. In addition, for a complex commercial facility including a plurality of tenants, there is included information that identifies the location of each tenant that occupies the complex commercial facility. Using those pieces of information, a course that can be selected by the user after getting out of the vehicle is identified, and an after-getting-out-of-vehicle network is generated. The after-getting-out-of-vehicle network generated at the above-described S22 is a network representing a course that can be selected by the user with moving means used after getting out of the vehicle, using information about regions through which pedestrians can pass between the parking lot to the destination. Note that when the destination is a parking lot, an after-getting-out-of-vehicle network is not constructed.

Figure 8:
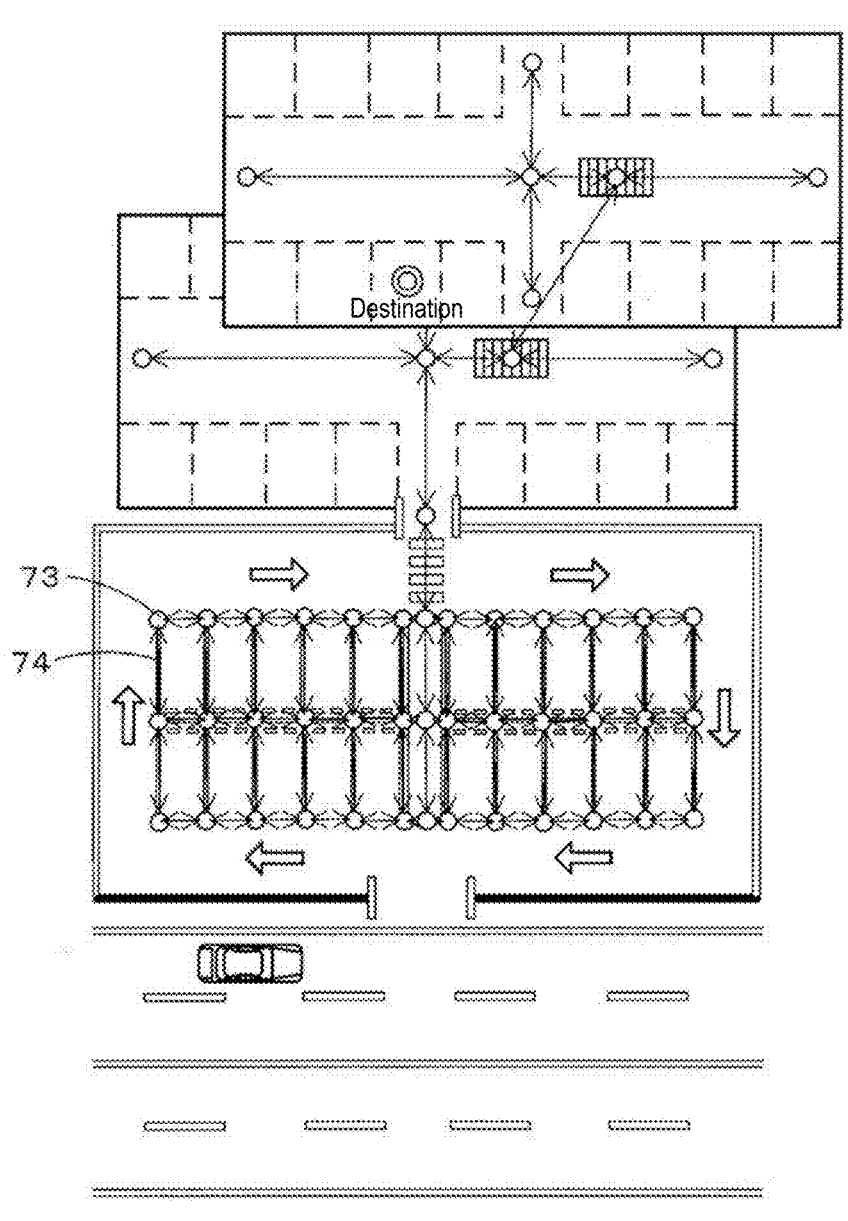
FIG. 8 is a diagram showing an example of an after-getting-out-of-vehicle network constructed for a segment between a parking lot to a destination.

Here, an example of the after-getting-out-of-vehicle network constructed at the above-described S22 is shown in FIG. 8. Particularly, FIG. 8 shows an example case in which the destination is a tenant in a complex commercial facility including a plurality of tenants. As shown in FIG. 8, an after-getting-out-of-vehicle network is constructed using walk nodes 73 and walk links 74. Note that a walk node 73 is set at each of an intersection at which passages through which pedestrians can pass intersect each other (in addition to passages dedicated for pedestrians, passages through which vehicles can pass may also be included; the same also applies hereinafter), a corner of a passage through which pedestrians can pass, end points of a section line that marks off a parking space, the entrances and exits, stairs, elevators, and escalators of a facility which is the destination, etc. On the other hand, a walk link 74 is set in a region through which pedestrians can pass between walk nodes 73. Note that the region through which pedestrians can pass corresponds to a passage through which only pedestrians can pass (also including stairs, an escalator, a crosswalk, a footbridge, and a moving walkway) in addition to a passage on which vehicles can also travel, and a section line of a parking space. In addition, the walk link 74 also includes information that identifies a direction in which pedestrians can pass.

Figure 9:
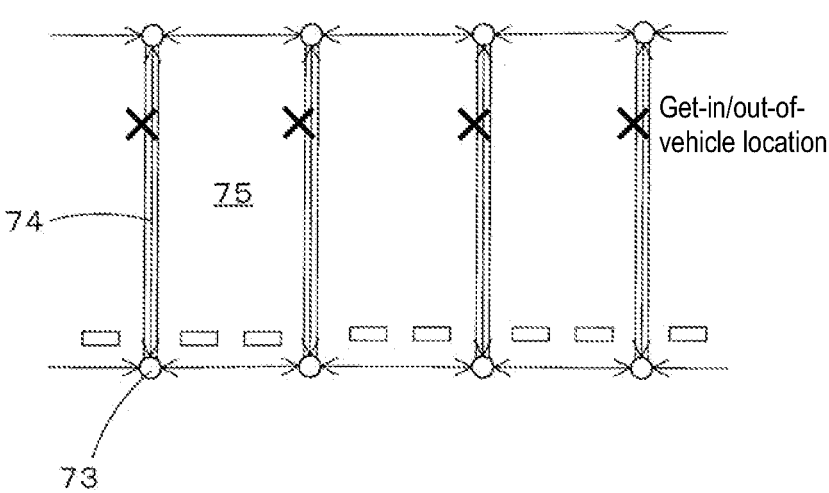
FIG. 9 is a diagram showing an after-getting-out-of-vehicle network constructed based on section lines of parking spaces.

Here, for walk links 74 set on section lines of parking spaces, as shown in FIG. 9, regardless of whether section lines are actually painted on a road surface, walk links 74 are set at boundaries that enclose a rectangular parking space 75 (i.e., in a rectangular shape). For example, in an example shown in FIG. 9, section lines are actually painted only on left and right boundaries of a parking space 75, but walk links 74 are set considering that section lines are also painted on front and back boundaries of the parking space 75. Note, however, that walk links 74 may be set only at boundaries where section lines are actually painted.

Subsequently, at S23, the CPU 51 sets, for the after-getting-out-of-vehicle network constructed at the above-described S22, particularly, for the walk nodes 73, costs and directions (directions in which the user can pass through the walk nodes). For example, for each walk node 73 corresponding to an intersection, stairs, an elevator, or an escalator, a cost based on an item corresponding to the walk node 73 is set, and a direction in which the user can pass through the walk node 73 is set.

Thereafter, at S24, the CPU 51 calculates, for each walk node 73 that serves as a connecting part of the after-getting-out-of-vehicle network, a total of costs from the destination, using Dijkstra's algorithm, and links the total of costs to the walk node 73. Each parking space provided in the parking lot is an end point of calculation of a total of costs. Note that for a method of searching for a route, search means other than Dijkstra's algorithm may be used.

Here, the total of costs calculated at the above-described S24 is a total of a cost set for a walk node 73 at the above-described S23 and a cost of a walk link 74. The cost of a walk link 74 is provided for each walk link 74, and time taken to move along each walk link 74 is used as a reference value. Namely, a higher cost is calculated for a walk link 74 with longer time required to move therealong. Time taken to move along a walk link 74 is calculated by multiplying moving speed by the length of the link, and furthermore, the moving speed is, for example, a fixed value (e.g., 1 m/s) that takes into account moving speed for walk.

In addition, particularly, for the cost of a walk link 74, the above-described reference value is corrected on the following conditions (1) and (2).

(1) For the cost of a walk link 74 in which the user moves using stairs, an elevator, or an escalator, the reference value is multiplied by a predetermined value determined based on the type, i.e., stairs, an elevator, or an escalator. Here, for the predetermined value to be multiplied, the stairs have the largest predetermined value (e.g., 1.3), the escalator has the second largest predetermined value (e.g., 0.9), and the elevator has the smallest predetermined value (e.g., 0.8). In addition, for a walk link 74 in which the user moves using an elevator, it is desirable to set a reference value for cost based on the number of floors to which the user moves. For example, the reference value is set to 3 seconds per movement for one floor. Furthermore, if elevator wait time (which may be average wait time) can be grasped, then it is desirable to also add the wait time.

(2) For the cost of a walk link 74, a predetermined value is added or multiplied depending on the configuration and type of a passage on which the user moves. For example, for the cost of a walk link 74 having a door in the middle thereof, taking into account time taken to open and close the door, a predetermined value (e.g., 3 seconds per door) is added to the reference value. In addition, for the cost of a walk link 74 in which the user moves on a passage other than passages dedicated for pedestrians, since the user needs to move watching for vehicles, etc., a predetermined value (e.g., 1.2) is multiplied, taking into account a burden of the movement. In addition, for the cost of a walk link 74 in which the user moves on an outdoor passage with no roof, a correction is made based on the current weather, timeframe, and temperature. For example, in a case of rainy weather, a case of a low or high temperature (e.g., 0° C. or lower or 30° C. or higher), or a case of nighttime, since a burden is imposed by movement, a predetermined value (e.g., 1.2) is multiplied. On the other hand, for the cost of a walk link 74 in which the user moves on a moving walkway, reversely, a correction is made to perform a subtraction on the reference value (e.g., 0.9 is multiplied).

Subsequently, at S25, the CPU 51 identifies a location at which the user gets in and out of the vehicle (i.e., the location of a driver's seat when the vehicle is parked in a parking space; hereinafter, referred to as get-in/out-of-vehicle location), targeting each parking space provided in the parking lot in which the vehicle is parked, as shown in FIG. 9. Then, using the total value of costs to each walk node 73 calculated at the above-described S24, the total value of costs from the destination to a get-in/out-of-vehicle location of each parking space provided in the parking lot in which the vehicle is parked in the after-getting-out-of-vehicle network is calculated, and is linked to the get-in/out-of-vehicle location.

Then, at S26, the CPU 51 constructs, based on the facility information 17 obtained at the above-described S3, a parking network, targeting the parking lot in which the user parks the vehicle. The facility information 17 includes information that identifies the location of an entrance/exit of the parking lot, information that identifies a layout of parking spaces in the parking lot, information about section lines that mark off the parking spaces, information about passages through which vehicles and pedestrians can pass, etc. Using those pieces of information, a course that can be selected by the vehicle in the parking lot is identified and a parking network is generated. The parking network generated at the above-described S26 is a network representing a course that can be selected by the vehicle when the vehicle travels in the parking lot.

Figure 10:
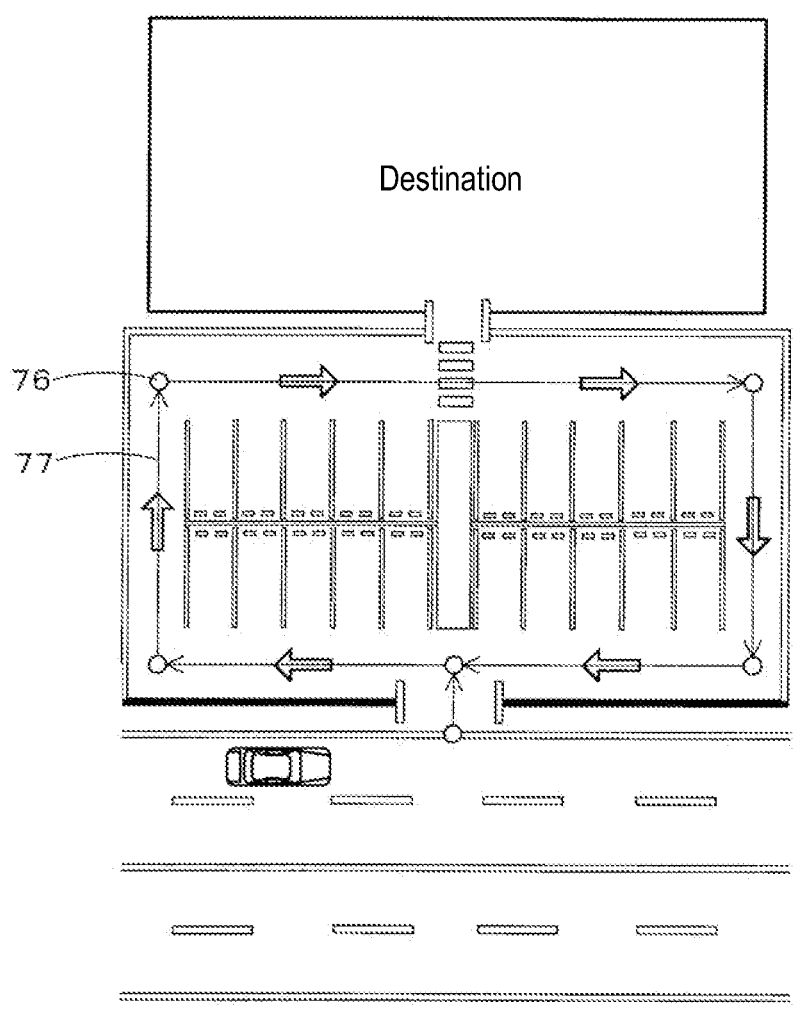
FIG. 10 is a diagram showing an example of a parking network constructed for a parking lot.

Here, an example of the parking network constructed at the above-described S26 is shown in FIG. 10. As shown in FIG. 10, a parking network is constructed using parking lot nodes 76 and parking lot links 77. Note that a parking lot node 76 is set at each of an entrance/exit of a parking lot, an intersection at which passages through which vehicles can pass intersect each other, and a corner of a passage through which vehicles can pass. On the other hand, a parking lot link 77 is set on a passage between parking lot nodes 76 through which vehicles can pass. In addition, the parking lot link 77 also includes information that identifies a direction in which vehicles can pass through the passage in the parking lot. For example, FIG. 10 shows an example in which vehicles can pass through passages in the parking lot only in a clockwise direction.

Note that although in the example shown in FIG. 10, parking lot nodes 76 are set at corners of passages through which vehicles can pass, instead of setting parking lot nodes 76 at the corners, a parking lot node 76 may be set only at a point at which there are a plurality of vehicle's traveling directions, like an intersection of passages. Note also that parking lot nodes 76 and parking lot links 77 for a parking network may be set on the same conditions as those for a lane network for roads which will be described later (see FIG. 12) (i.e., as a part of the lane network). For example, even in a parking lot, when a passage has a plurality of lanes, a parking lot link 77 may be set on each lane, and an attribute regarding the parking lot may be added to the link, etc.

Subsequently, at S27, the CPU 51 sets, for the parking network constructed at the above-described S26, particularly, for the parking lot nodes 76, costs and directions (directions in which the vehicle can pass through the parking lot nodes). For example, for each parking lot node 76 corresponding to an intersection or an entrance/exit of the parking lot, a cost based on an item corresponding to the parking lot node 76 is set, and a direction in which the vehicle can pass through the parking lot node 76 is set.

Thereafter, at S28, the CPU 51 calculates, for each parking lot node 76 that serves as a connecting part of the parking network, a total of costs from a get-in/out-of-vehicle location, using Dijkstra's algorithm, and links the total of costs to the parking lot node 76. The entrance/exit of the parking lot is an end point of calculation of a total of costs. For a parking lot having a plurality of parking spaces, the total value of costs from a get-in/out-of-vehicle location of each parking space is calculated. Note that for a method of searching for a route, search means other than Dijkstra's algorithm may be used. In addition, a total of costs from a point-of-departure side instead of a destination side may be calculated.

Here, the total of costs calculated at the above-described S28 is a total of a cost set for a parking lot node 76 at the above-described S27 and a cost of a parking lot link 77. The cost of a parking lot link 77 is provided for each parking lot link 77, and time taken to move along each parking lot link 77 is used as a reference value. Namely, a higher cost is calculated for a parking lot link 77 with longer time required to move therealong. Time taken to move along a parking lot link 77 is calculated by multiplying moving speed by the length of the link, and furthermore, the moving speed is, for example, a fixed value (e.g., 3 m/s) that takes into account vehicle's moving speed in the parking lot.

In addition, particularly, for the cost of a parking lot link 77, the above-described reference value is corrected on the following condition (3).

(3) For the cost of a segment in which the vehicle needs to move backward for parking, a predetermined value (e.g., 2) is multiplied. In addition, the number of back-and-forth movements performed to park into a parking space in which the vehicle is parked is calculated based on the location of the parking space and the configuration of a passage facing the parking space, and a predetermined value determined based on the calculated number of back-and-forth movements is added to the reference value for the cost of a parking lot link 77 that enters the parking space. For example, "the number of back-and-forth movements×3 seconds" is added. Note that in the present embodiment, an operation of parking into a parking space is also performed by autonomous driving, but when an operation of parking into a parking space is performed by manual driving, a parking space with a large number of back-and-forth movements is a parking space with a high parking difficulty level, and thus, taking into account a burden of a user's operation, it is desirable to increase a value to be added.

Then, at S29, the CPU 51 constructs, based on the highly accurate map information 16 obtained at the above-described S3, a lane network, targeting the candidate course (obtained at S2) which is a candidate for the vehicle to travel to the parking lot in which the user parks the vehicle. The highly accurate map information 16 includes lane configurations, section line information, and information about intersections, and furthermore, the lane configurations and the section line information include, for example, information that identifies the number of lanes, how and at which location the number of lanes increases or decreases when there is an increase or a decrease in the number of lanes, a passage segment in a traveling direction for each lane and a connection between roads for each lane (specifically, a correspondence between a lane included in a road before passing through an intersection and a lane included in a road after passing through the intersection), and guidelines (white guidelines) in intersections. The lane network generated at the above-described S29 is a network representing movement into lanes that can be selected by the vehicle when the vehicle travels along the candidate course. When there are a plurality of candidate courses obtained at the above-described S2, the above-described construction of a lane network is performed for the plurality of candidate courses. In addition, a lane network is constructed targeting a segment from a current location of the vehicle (travel start point) to an entry road facing the entrance to the parking lot in which the user parks the vehicle.

Figure 11:
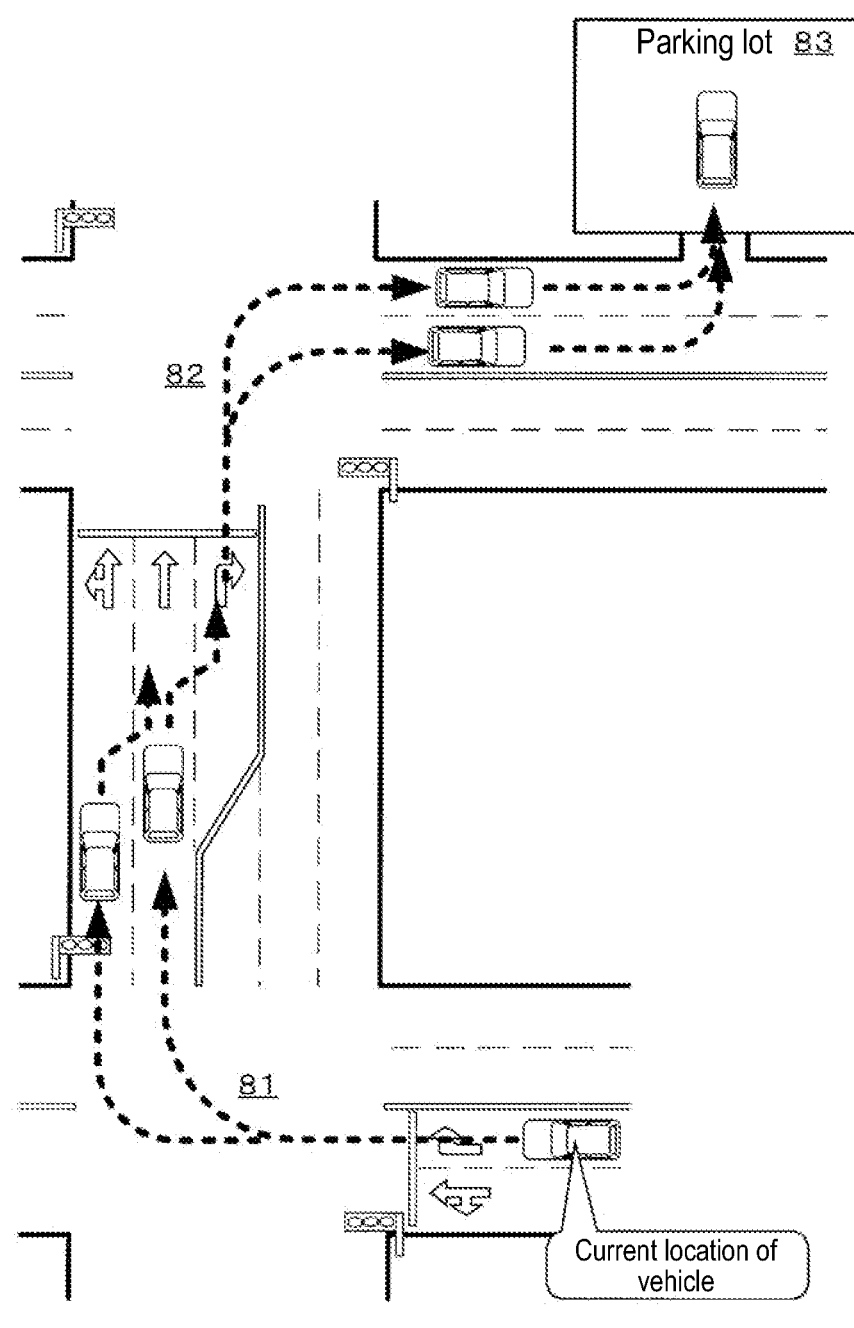
FIG. 11 is a diagram showing an example of candidate courses to a parking lot.

Here, as an example of constructing a lane network at the above-described S29, for example, a case in which the vehicle travels along candidate courses shown in FIG. 11 will be described as an example. In the example shown in FIG. 11, the candidate courses each are a course in which the vehicle travels straight ahead from its current location, and then turns right at a next intersection 81 and further turns right at a next intersection 82, too, and makes a left turn to enter a parking lot 83 that is where to park the vehicle. In the candidate courses shown in FIG. 11, for example, when the vehicle turns right at the intersection 81, the vehicle can enter a right lane or can also enter a left lane. Note, however, that since the vehicle needs to turn right at the next intersection 82, the vehicle needs to move into the far right lane at the time of entering the intersection 82. In addition, when the vehicle turns right at the intersection 82, too, the vehicle can enter a right lane or can also enter a left lane. Lane networks constructed targeting the candidate courses that allow such movement into lanes are shown in FIG. 12.

Figure 12:
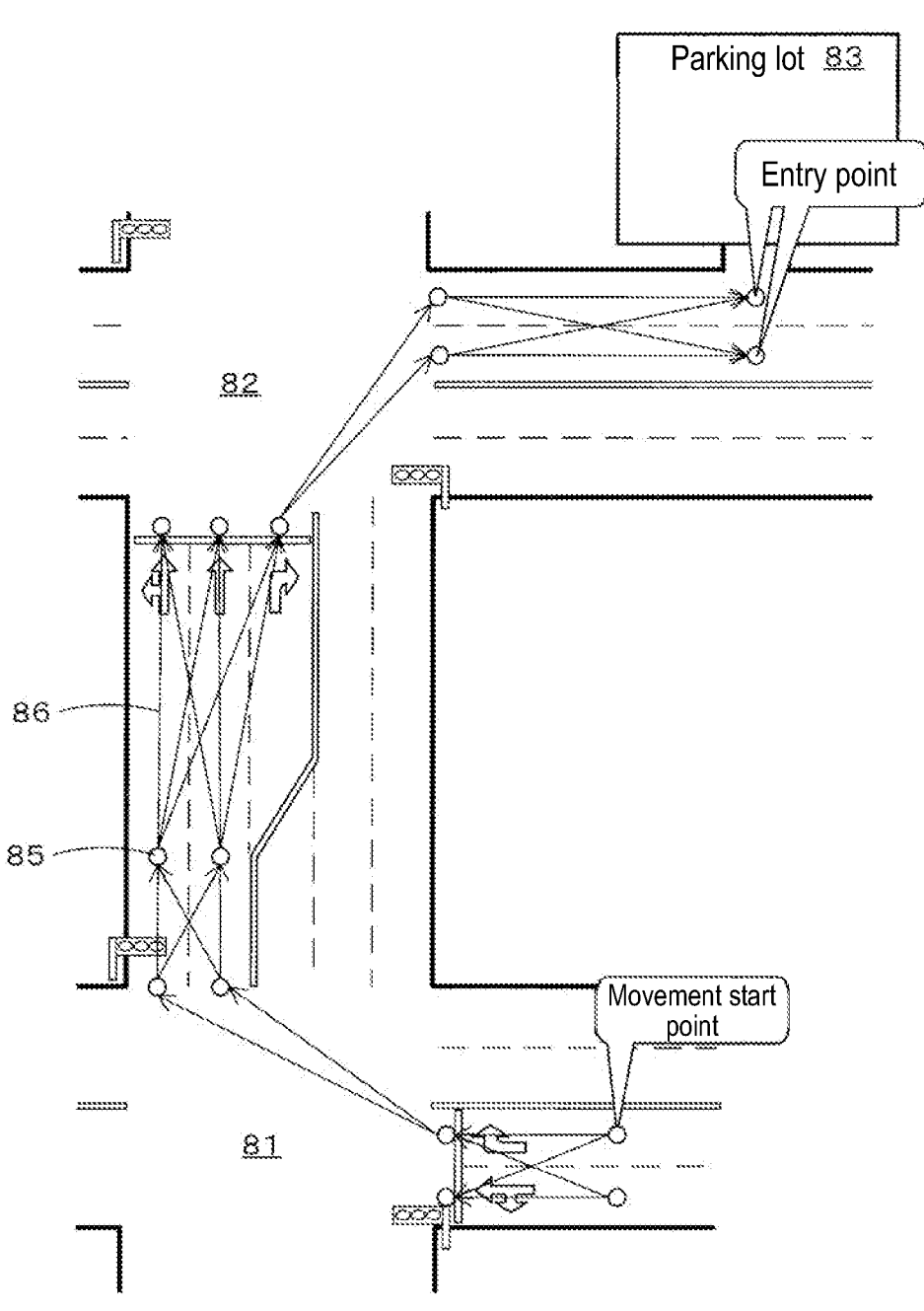
FIG. 12 is a diagram showing an example of lane networks constructed for the candidate courses shown in FIG. 11.

As shown in FIG. 12, in a lane network, a candidate course for which a static travel path is to be generated is divided into a plurality of sections (groups). Specifically, the candidate course is divided at a location where the vehicle enters an intersection, a location where the vehicle exits the intersection, and a location where the number of lanes increases or decreases, which serve as boundaries. A node point (hereinafter, referred to as lane node) 85 is set at a point in each lane located at a boundary of each divided section. Furthermore, a link (hereinafter, referred to as lane link) 86 that connects lane nodes 85 is set. Note that a start location (i.e., a start node) of the lane network is a current location of the vehicle (travel start point), and an end location (i.e., an end node) of the lane network is, particularly, a node (hereinafter, referred to as entry point) near an entrance to a parking lot in which the user parks the vehicle, the entry point being present on an entry road facing the entrance to the parking lot, and being newly generated with reference to a node location of the entrance to the parking lot that is set in a parking network.

In addition, the above-described lane network includes, particularly, information that identifies, by connection of lane nodes to a lane link at an intersection, a correspondence between a lane included in a road before passing through the intersection and a lane included in a road after passing through the intersection, i.e., a lane into which the vehicle can move after passing through the intersection from a lane taken before passing through the intersection. Specifically, the lane network indicates that the vehicle can move between lanes corresponding to lane nodes that are connected by a lane link among lane nodes set on the road before passing through the intersection and lane nodes set on the road after passing through the intersection.

Figure 13:
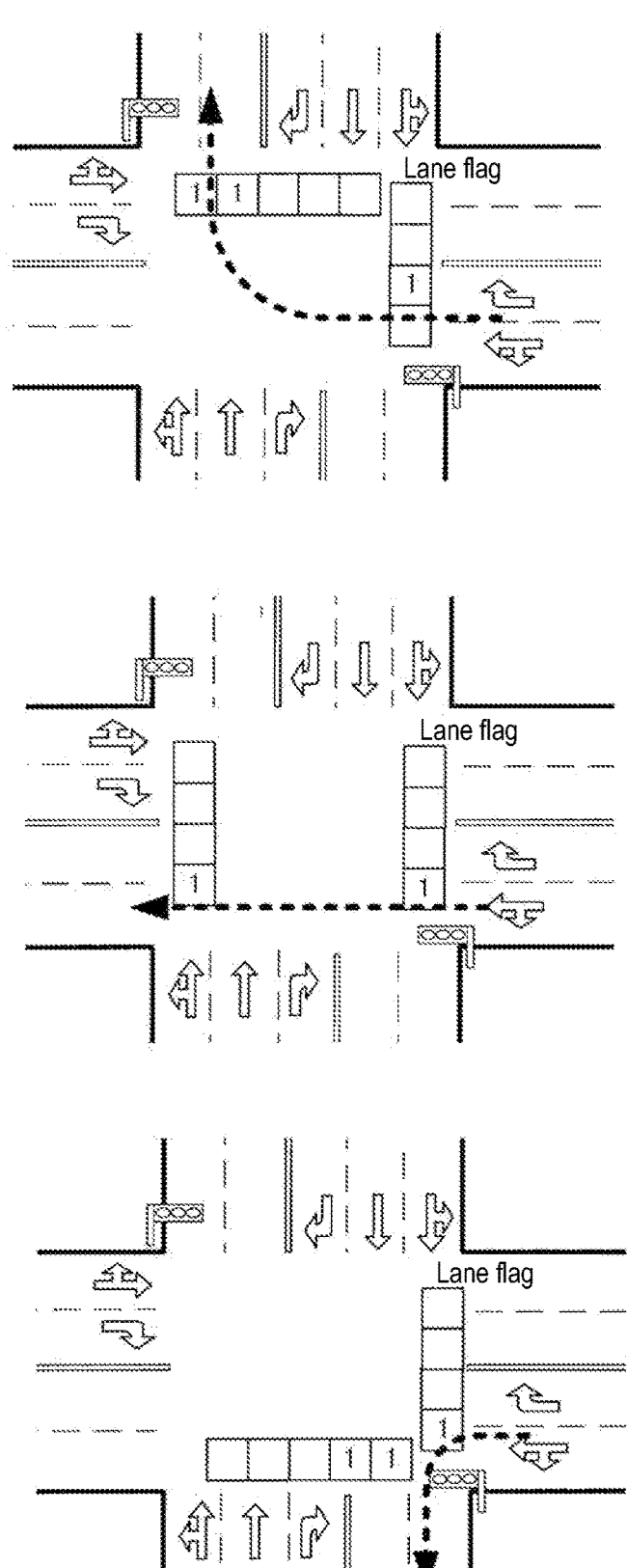
FIG. 13 is a diagram showing examples of lane flags indicating a correspondence between a lane included in a road before passing through an intersection and a lane included in a road after passing through the intersection.

To generate such a lane network, the highly accurate map information 16 stores, for each road connected to an intersection, lane flags indicating a correspondence between lanes and set for each combination of a road that enters the intersection and a road that exits the intersection. For example, FIG. 13 shows lane flags for entering an intersection from a road on the right side and exiting to a road on the upper side, lane flags for entering an intersection from a road on the right side and exiting to a road on the left side, and lane flags for entering an intersection from a road on the right side and exiting to a road on the lower side. The lane flags indicate that a lane whose lane flag is set to "1" among lanes included in a road before passing through an intersection is associated with a lane whose lane flag is set to "1" among lanes included in a road after passing through the intersection, i.e., the lanes whose lane flags are set to "1" are lanes between which the vehicle can move before and after passing through the intersection. When the CPU 51 constructs a lane network at the above-described S29, the CPU 51 forms connection of lane nodes to a lane link at an intersection by referring to the lane flags.

Note that when there are a plurality of candidate courses obtained at the above-described S2, a lane network shown in FIG. 12 is constructed likewise for each of the plurality of candidate courses.

Subsequently, at S30, the CPU 51 sets, for the lane network constructed at the above-described S29, particularly, for the lane nodes 85, costs and directions (directions in which the vehicle can pass through the lane nodes). For example, for each lane node 85 corresponding to an intersection or an entry point, a cost based on an item corresponding to the lane node 85 is set, and a direction in which the vehicle can pass through the lane node 85 is set.

In addition, particularly, the setting of a cost and a direction for a lane node 85 corresponding to an entry point is performed using the connection information 18 obtained at the above-described S3. Here, the connection information 18 is information indicating a connection relationship between a lane included in an entry road facing an entrance to the parking lot and the entrance to the parking lot, more specifically, information identifying, for each lane included in the entry road, whether the vehicle can enter the entrance to the parking lot from the lane.

Figure 14:
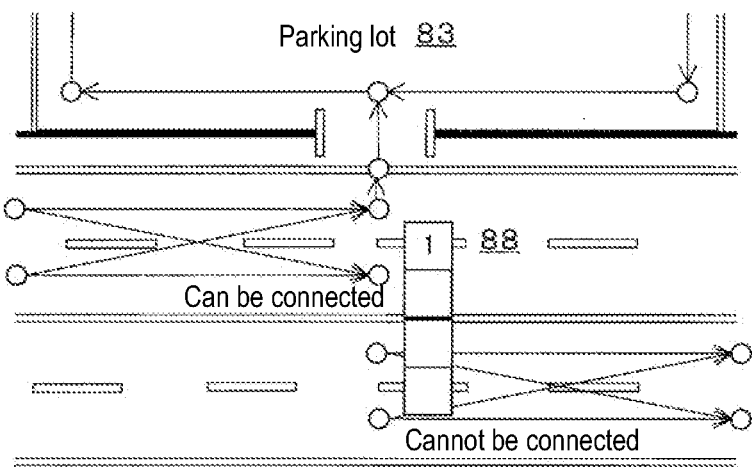
FIG. 14 is a diagram showing examples of connection information.
Figure 14:
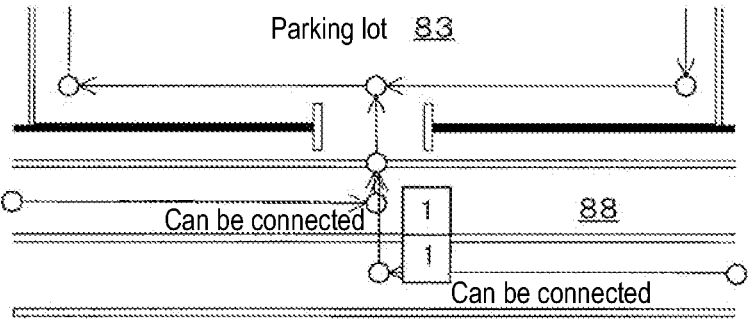

FIG. 14 is a diagram showing an example of the connection information 18. The connection information 18 stores an entry flag indicating whether the vehicle can enter an entrance to a parking lot and set for each lane included in an entry road. For example, a diagram at the top of FIG. 14 shows connection information 18 for a parking lot 83 that prohibits right-turn entry or that does not allow right-turn entry due to the presence of a median strip, and an entry road 88 with two lanes in each direction, and the entry flag "1" indicating that the vehicle can enter an entrance to the parking lot is set for a lane located closest to a parking lot 83 side among the four lanes included in the entry road 88. On the other hand, a diagram at the bottom of FIG. 14 shows connection information 18 for a parking lot 83 that allows right-turn entry and an entry road 88 with one lane in each direction, and the entry flag "1" indicating that the vehicle can enter an entrance to the parking lot is set for both of the two lanes included in the entry road 88.

As a result, for example, when costs and directions for lane nodes 85 corresponding to entry points are set based on the connection information 18 shown in the diagram at the top of FIG. 14, a direction of entering the parking lot is set to a lane node 85 corresponding to an entry point on a lane located closest to a parking lot 83 side, and a direction of entering the parking lot is not set to a lane node 85 corresponding to an entry point on a lane other than the lane. As a result, in a route search which will be described later, only a route that reaches the entry point on the lane located closest to the parking lot 83 side from the left side of the drawing serves as a search target. Note that in addition to the setting of directions, the setting of costs may be performed. For example, by providing a very high cost to a lane node 85 corresponding to an entry point other than the entry point on the lane located closest to the parking lot 83 side, only a route that reaches the entry point on the lane located closest to the parking lot 83 side from the left side of the drawing can likewise serve as a search target.

On the other hand, when costs and directions for lane nodes 85 corresponding to entry points are set based on the connection information 18 shown in the diagram at the bottom of FIG. 14, a direction of entering the parking lot is set to lane nodes 85 corresponding to entry points on both lanes. As a result, in a route search which will be described later, there is a possibility that both a route that reaches an entry point from the right side of the drawing and a route that reaches an entry point from the left side of the drawing may be searched. Note, however, that for the route that reaches an entry point from the right side of the drawing, since the vehicle crosses a lane upon entering the parking lot, a higher cost may be provided to a lane node 85 corresponding to an entry point that enters from the right side of the drawing. As a result, the route that reaches an entry point from the left side of the drawing is searched on a priority basis.

Thereafter, at S31, the CPU 51 calculates, for each lane node 85 that serves as a connecting part of the lane network, a total of costs from the entry point, using Dijkstra's algorithm, and links the total of costs to the lane node 85. A current location of the vehicle is an end point of calculation of a total of costs. When a parking lot in which the vehicle is parked is a parking lot having a plurality of entrances and exits, i.e., when there are a plurality of entry points, the total value of costs from each entry point is calculated. Note that for a method of searching for a route, search means other than Dijkstra's algorithm may be used. In addition, a total of costs from a point-of-departure side instead of a destination side may be calculated.

Here, the total of costs calculated at the above-described S31 is a total of a cost set for a lane node 85 at the above-described S30 and a cost of a lane link 86. The cost of a lane link 86 is provided for each lane link 86, and time taken to move along each lane link 86 is used as a reference value. Namely, a higher cost is calculated for a lane link 86 with longer time required to move therealong. Time taken to move along a lane link 86 is calculated by multiplying moving speed by the length of the link, and furthermore, the moving speed is a speed limit set for a road.

In addition, particularly, for the cost of a lane link 86, the above-described reference value is corrected on the following conditions (4) to (6).

Figure 15:
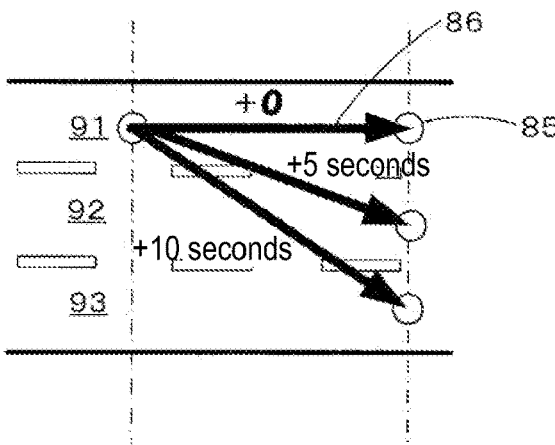
FIG. 15 is a diagram showing a relationship between the number of lane changes and a cost.

(4) For the cost of a lane link 86, a predetermined value determined based on the number of lane changes required is added to the reference value. Here, as shown in FIG. 15, the predetermined value to be added is larger for a lane link 86 that requires a larger number of lane changes. For example, a lane link 86 that moves from a lane 91 to a lane 92 requires one lane change and thus "5 seconds" is added to the reference value. In addition, a lane link 86 that moves from the lane 91 to a lane 93 requires two consecutive lane changes and thus "10 seconds" is added to the reference value. On the other hand, a lane link 86 that maintains the lane 91 does not require a lane change and thus addition is not performed. As a result, a larger total value of costs is calculated for a route with a larger number of lane changes, and thus, the route is less likely to be selected as a recommended way of moving into lanes. In addition, for a route in which a plurality of lane changes are made (i.e., lane changes are consecutively made) in the same segment, a larger total value of costs is calculated over a route in which lane changes are not consecutively made, and thus, the route is less likely to be selected as a recommended way of moving into lanes.

Figure 16:
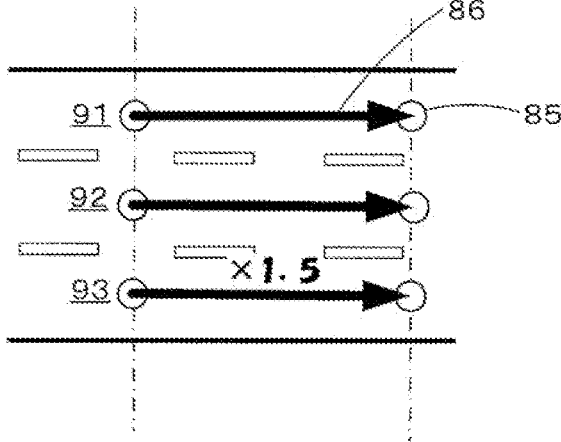
FIG. 16 is a diagram showing a relationship between a travel lane and a cost.

(5) For the cost of a lane link 86 in which the vehicle travels in a passing lane without making a lane change (e.g., in left-hand traffic, the far right lane), the reference value is multiplied by a predetermined coefficient. For example, as shown in FIG. 16, for the cost of a lane link 86 in which the vehicle travels in a lane 93 which is a passing lane, the reference value is multiplied by "1.5". As a result, a larger total value of costs is calculated for a route with a longer distance in which the vehicle travels in the passing lane, and thus, the route is less likely to be selected as a recommended way of moving into lanes.

Figure 17:
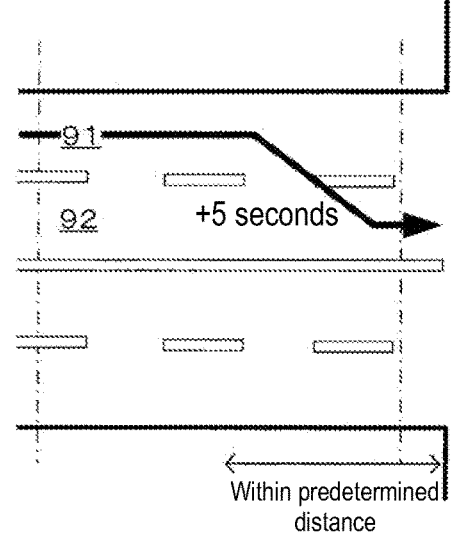
FIG. 17 is a diagram showing a relationship between a location at which a lane change is made and a cost.

(6) For a route including a segment (group) in which a lane change is made, a plurality of patterns for a candidate location at which the lane change is made are generated, and a total of costs is calculated for each of the plurality of patterns. Specifically, a location at which a lane change is made is referred to for each pattern, and for a pattern corresponding to any one of: (A) a case in which a travel distance of a passing lane before or after making a lane change is longer than a threshold value; (B) a case in which upon making a plurality of lane changes, a time interval between the lane changes is shorter than a threshold value (i.e., lane changes are consecutively made); and (C) a case in which a lane change is made within a predetermined distance before an intersection (e.g., 700 m for a general road and 2 km for an expressway), for the cost of a lane link in which a lane change is made, a predetermined value is further added to the reference value. For example, as shown in FIG. 17, for a pattern in which the vehicle moves from a lane 91 to a lane 92 between a location a predetermined distance before an intersection and the intersection, "5 seconds" is added to the reference value.

Thereafter, at S32, the CPU 51 sets each of a movement start point at which the vehicle starts moving and a movement target point which is a target to which the vehicle moves, in the networks constructed at the above-described S22, S26, and S29. Note that the movement start point is a current location of the vehicle, and the movement target point is, when the destination is a parking lot, a parking space in the parking lot and is, when the destination is not a parking lot, an entrance to a facility which is the destination. In addition, when a facility which is the destination is a complex commercial facility including a plurality of tenants and any of the tenants is specified as the destination, the location of the tenant in the facility is set as the movement target point.

Furthermore, at S32, the CPU 51 outputs, using the costs calculated for each network at the above-described S24, S25, S28, and S31, a combination of routes connecting the movement start point to the movement target point, in which a total of routes of the after-getting-out-of-vehicle network, the parking network, and the lane network is minimum. Note that of the outputted routes, a route of the after-getting-out-of-vehicle network and a route of the parking network are a combination of routes that can be connected to each other, with the entrance to the parking lot in which the vehicle is parked being a boundary, and the route of the parking network and the route of the after-getting-out-of-vehicle network are a combination of routes that can be connected to each other, with a get-in/out-of-vehicle location of any one of parking spaces provided in the parking lot in which the vehicle is parked being a boundary.

The combination of routes outputted at the above-described S32 serves as a travel path of the vehicle (a way of moving into lanes) recommended when the vehicle moves to a parking space in the parking lot and as a course from the parking space to the destination that is recommended for movement after getting out of the vehicle. In addition, of the routes outputted at the above-described S32, a parking space corresponding to a get-in/out-of-vehicle location present at a boundary between the route of the parking network and the route of the after-getting-out-of-vehicle network serves as a parking space in which the vehicle is parked in the parking lot.

Here, a total of the costs calculated for each network at the above-described S24, S25, S28, and S31 includes both a cost required for the vehicle to move to the parking space and a cost required for movement after getting out of the vehicle from the parking space. Namely, a parking space in which the vehicle is parked is selected taking into account also a burden associated with user's movement after parking, in addition to a burden imposed until the vehicle is parked.

Figure 18:
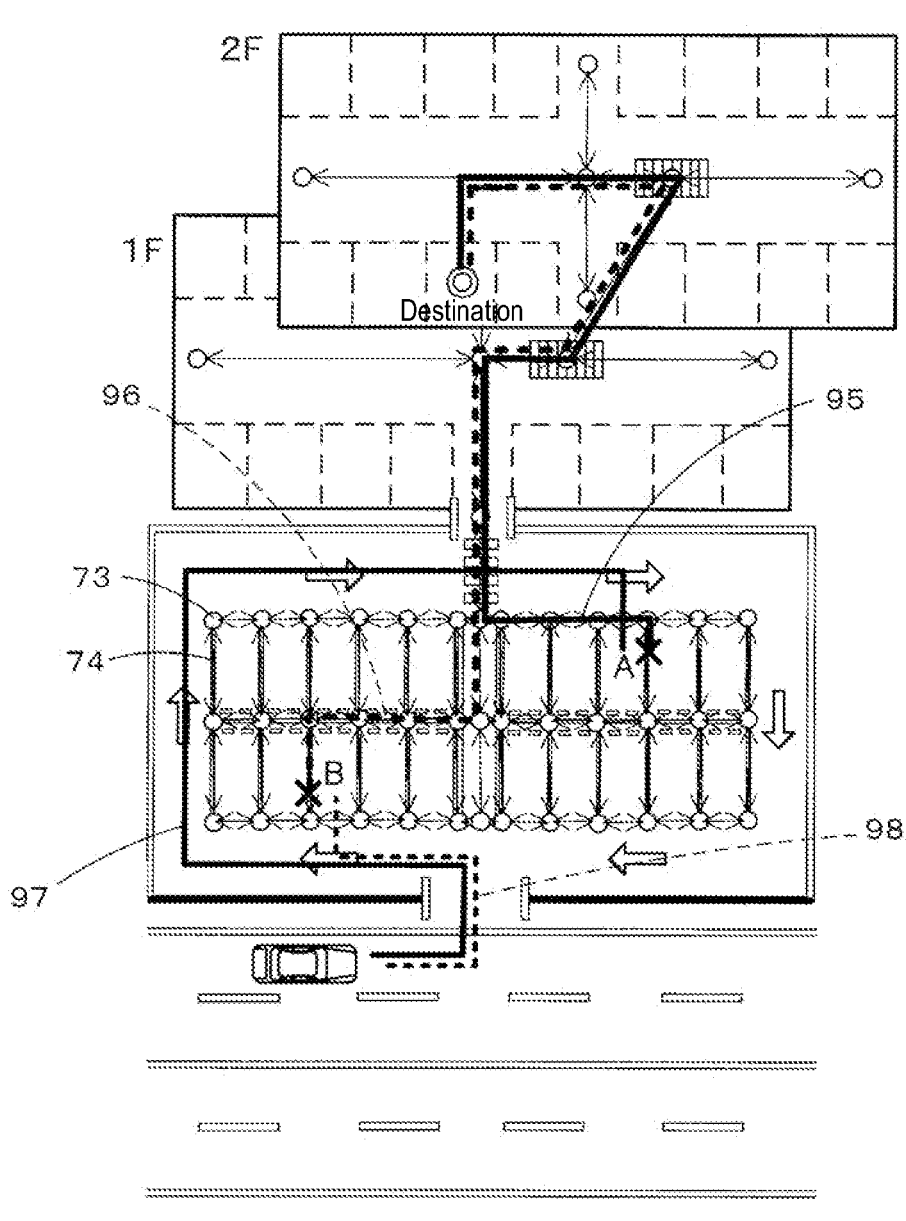
FIG. 18 is a diagram describing a method of identifying a parking space recommended for parking.

For example, as shown in FIG. 18, when there are two parking spaces, a parking space A and a parking space B, as candidate parking spaces for parking the vehicle at a destination, if a comparison is only made between routes 95 and 96 taken for movement after getting out of the vehicle, then the route 95 taken when the vehicle is parked in the parking space A has shorter time taken to move to a tenant which is the destination, and thus, the parking space A can be said to be an appropriate parking space for parking. However, if a comparison is also made between routes 97 and 98 each taken for the vehicle to move from when the vehicle enters a parking lot to when the vehicle is parked in a parking space, then the route 97 taken when the vehicle is parked in the parking space A is a detour route compared to the route 98 taken when the vehicle is parked in the parking space B, and thus, the parking space A cannot necessarily be said to be an appropriate parking space for parking. Hence, in the present embodiment, as described above, a parking space in which the vehicle is parked is selected by a total of costs that takes into account both a burden imposed until the vehicle is parked and a burden associated with user's movement after parking and that uses a lane network, a parking network, and an after-getting-out-of-vehicle network, by which a more optimal parking space for the user to park the vehicle can be selected.

In addition, in the above-described implementation example, a parking space in which the vehicle is parked is selected taking into account a burden associated with user's movement to the destination including before and after parking, but a parking space in which the vehicle is parked may be selected taking into account also a burden associated with user's movement upon going back home from the destination. For example, a parking space may be selected by searching for a route with a minimum cost, including a return route from a destination to an exit of a parking lot in addition to an outward route to the destination. As a result, a parking space can be selected taking into account time taken to move to the parking space upon going back home from the destination, easiness in leaving the parking space, and time required for the vehicle to move from the parking space to the exit of the parking lot.

In addition, at the above-described S32, the CPU 51 corrects costs using the above-described conditions (4) to (6), thereby comparing the total values of costs for each route (for a route including a plurality of patterns for movement into lanes, furthermore, for each pattern) to identify a route and a pattern with a minimum total value of costs as a way of moving by the vehicle into lanes that is recommended when the vehicle moves, by which in addition to a segment recommended to make a lane change, a location in the segment that is recommended to make a lane change is also identified. Note that for a pattern for movement into lanes in which lane changes are consecutively made, a pattern for movement into lanes with a long distance of a passing lane in which the vehicle travels before or after making a lane change, and a pattern for movement into lanes in which a lane change is made between a location a predetermined distance before an intersection and the intersection, a larger total value of costs is calculated over a pattern in which such a lane change(s) is not made, and thus, those patterns are less likely to be selected as a recommended way of moving into lanes.

In addition, in the above-described implementation example, for public roads (i.e., a lane network for roads) and a portion in a parking lot (i.e., a parking network), a route with a minimum total value of costs that are set on a lane-by-lane basis is searched, by which a parking space is selected, but for public roads (i.e., a lane network for roads) and a portion in a parking lot (i.e., a parking network), costs on a road-by-road basis instead of on a lane-by-lane basis may be used. Namely, using costs on a road-by-road basis, a route with a minimum cost on a road-by-road basis is searched, and a parking space through which a route with a minimum cost passes is selected as a parking space in which the vehicle is parked in the parking lot. Note that after determining a route with a minimum cost that is searched on a road-by-road basis and a parking space in which the vehicle is parked, a route with a minimum cost is searched using a lane network included in the searched route and costs set on a lane-by-lane basis, by which a recommended way of moving into lanes can be determined.

In addition, in the above-described implementation example, cost computation is individually performed on the after-getting-out-of-vehicle network constructed at the above-described S22, the parking network constructed at the above-described S26, and the lane network constructed at the above-described S29 (S23, S24, S27, S28, S30, and S31), but a network including all of movement of the vehicle from a current location of the vehicle to the parking lot, movement of the vehicle in the parking lot, and user's movement after getting out of the vehicle in the parking lot may be generated by connecting together the after-getting-out-of-vehicle network, the parking network, and the lane network, and cost computation may be performed on the network.

In addition, when open parking space information for a parking lot in which the vehicle is parked can be obtained, a route may be searched taking into account the open parking space information. Namely, a search target may only be a route that passes through a get-in/out-of-vehicle location of an open parking space.

Then, at S33, the CPU 51 calculates a recommended travel path, targeting, particularly, a section (group) in which a lane change is made, when the vehicle moves in accordance with the routes outputted at the above-described S32. Note that when the routes outputted at the above-described S32 are routes with no lane changes, the process at S33 may be omitted.

Specifically, the CPU 51 calculates a travel path using, for example, map information for a location at which a lane change is made in the routes outputted at the above-described S32. For example, a path that is as smooth as possible and that has the shortest possible distance required for a lane change is calculated using a clothoid curve, on conditions that lateral acceleration (lateral G) occurring when the vehicle makes a lane change does not interfere with autonomous driving assistance and does not exceed an upper limit value (e.g., 0.2 G) at which a passenger of the vehicle is not given discomfort, the lateral G being calculated based on vehicle speed (a speed limit for a corresponding road) and lane width. Note that the clothoid curve is a curve formed by a vehicle's trajectory when the vehicle has a constant travel speed and the steering is turned at a constant angular speed.

Then, at S34, the CPU 51 calculates a recommended travel path, targeting, particularly, a section (group) in an intersection when the vehicle moves in accordance with the routes outputted at the above-described S32. Note that when the routes outputted at the above-described S32 are routes that do not pass through any intersection, the process at S34 may be omitted.

Figure 19:
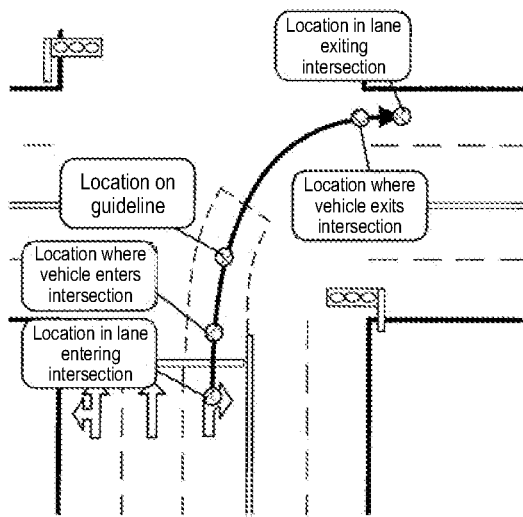
FIG. 19 is a diagram showing an example of a travel path recommended upon passing through an intersection.

For example, FIG. 19 describes, as an example, a case in which a travel path is calculated targeting a section (group) in an intersection that is set with a route for movement into lanes in which the vehicle enters the intersection from the far right lane and thereafter exits to the far left lane. First, the CPU 51 marks locations in the intersection through which the vehicle is to pass. Specifically, each of a location in a lane entering the intersection, a location at which the vehicle enters the intersection, a location on a guideline in the intersection (only when there is a guideline), a location at which the vehicle exits the intersection, and a lane exiting the intersection is marked. Then, a curve that passes through all of the marked marks is calculated as a travel path. More specifically, the marks are connected by a spline curve and then a clothoid curve that approximates the connected curve is calculated as a travel path. Note that the clothoid curve is a curve formed by a vehicle's trajectory when the vehicle has a constant travel speed and the steering is turned at a constant angular speed.

Subsequently, at S35, the CPU 51 calculates a travel path recommended, particularly, upon entering the parking lot from the entry road when the vehicle moves in accordance with the routes outputted at the above-described S32.

Figure 20:
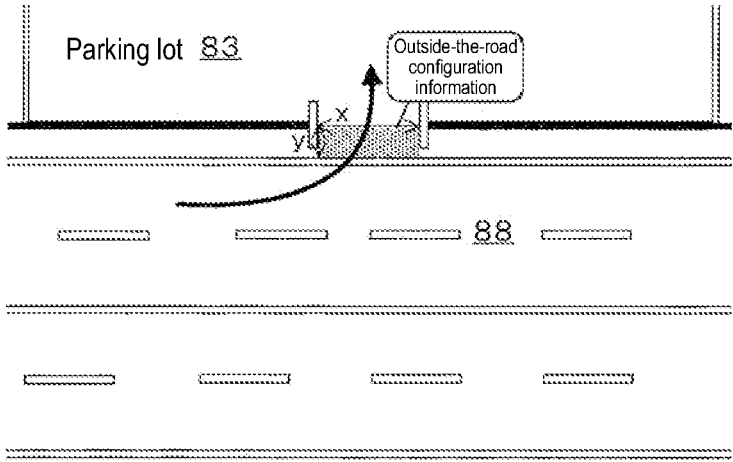
FIG. 20 is a diagram showing an example of a travel path recommended upon entering an entrance to a parking lot.

For example, FIG. 20 describes an example of calculating a travel path for a case in which a route is set in which the vehicle enters an entrance to a parking lot 83 from the far left lane of an entry road 88. First, the CPU 51 identifies, based on the outside-the-road configuration information obtained at the above-described S3, a region between the entry road 88 and the parking lot 83 through which the vehicle can pass (hereinafter, referred to as passage region). For example, in the example shown in FIG. 20, an x (wide) by y (long) rectangular area is a passage region between the entry road 88 and the parking lot 83 through which the vehicle can pass. Then, on condition that the vehicle passes through the passage region from the entry road 88 and enters the entrance to the parking lot 83, a path that is as smooth as possible and that has the shortest possible distance required for entry is calculated using a clothoid curve.

Thereafter, at S36, the CPU 51 calculates a travel path recommended, particularly, upon parking into the parking space when the vehicle moves in accordance with the routes outputted at the above-described S32.

Figure 21:
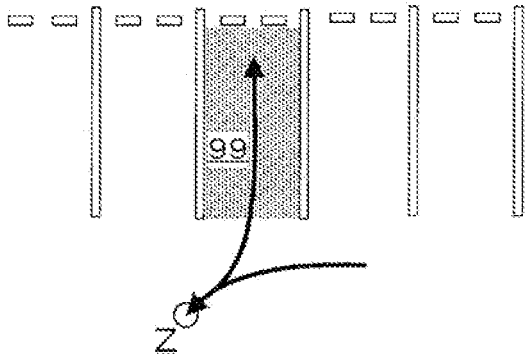
FIG. 21 is a diagram showing an example of a travel path recommended upon parking into a parking space.

For example, FIG. 21 describes an example of calculating a travel path for a case in which the vehicle is parked in a parking space 99 in a parking lot. First, the CPU 51 obtains, based on the facility information obtained at the above-described S3, the configuration of the parking space 99 that is where to park the vehicle and that is determined at the above-described S32, and the passage width of a passage that the parking space 99 faces. Thereafter, a back-and-forth movement point z at which the vehicle moves forward and backs up is set, and a path is calculated in which the vehicle traveling in parallel to the passage enters the parking space 99 via the back-and-forth movement point z as smooth as possible and at the shortest possible distance required for parking. Note that when the passage width of the passage is narrow, a plurality of back-and-forth movement points z may be set. On the other hand, for a parking lot that requires forward parking, a back-and-forth movement point z is not set and a travel path for performing forward parking is calculated.

Thereafter, at S37, the CPU 51 generates a static travel path which is a travel path recommended for the vehicle to travel along, by connecting together the travel paths calculated at the above-described S33 to S36. Note that for a segment that is not a section in which a lane change is made or not a section in an intersection or not a section in which the vehicle enters a parking lot or not a segment in which a parking operation is performed, a path that passes through the center of a lane (in the parking lot, a path that passes through the center of a passage) is determined to be a travel path recommended for the vehicle to travel along. Note, however, that for a corner that is curved at a substantially right angle, it is desirable to round a portion that is a corner of a path.

The static travel path generated at the above-described S37 includes a first travel path recommended for the vehicle to travel along in lanes from the travel start point to the entry road facing the entrance to the parking lot; a second travel path recommended for the vehicle to travel along from the entry road to the entrance to the parking lot; and a third travel path recommended for the vehicle to travel along from the entrance to the parking lot to the parking space in which the vehicle is parked. A movement course from the parking space to the destination is not a course in which the vehicle moves, and thus is excluded from the static travel path.

Then, the static travel path generated at the above-described S37 is stored in the flash memory 54, etc., as assistance information used for autonomous driving assistance.

Next, a subprocess of the speed plan creating process performed at the above-described S5 will be described based on FIG. 22. FIG. 22 is a flowchart of a subprocess program of the speed plan creating process.

First, at S41, the CPU 51 obtains, using map information, speed limit information for each road included in the static travel path generated at the above-described S4. Note that for a road whose speed limit information cannot be obtained, a speed limit is identified based on the road type. For example, 30 km/h is set for narrow streets, 40 km/h is set for general roads other than trunk roads, 60 km/h is set for trunk roads such as national highways, and 100 km/h is set for expressways. Note that the speed limit information may be obtained from the highly accurate map information 16 or may be obtained from normal map information used for a course search. In addition, a speed limit set for traveling in the parking lot in which the user parks the vehicle is also obtained. For a parking lot whose speed limit is not specified, for example, the speed limit is set at 3 m/s.

Then, at S42, the CPU 51 identifies speed change points which are points in the static travel path at which the speed of the vehicle changes. Here, the speed change points correspond, for example, to an entrance to a parking lot, intersections, curves, railroad crossings, crosswalks, and stops. When there are a plurality of speed change points in the static travel path, the plurality of speed change points are identified. Particularly, an entrance to a parking lot is identified using the facility information 17 and the outside-the-road configuration information 19, and whether there is a sidewalk between the entrance to the parking lot and an entry road is also identified. In addition, a crosswalk and a stop present in the parking lot are identified using the facility information 17.

Subsequently, at S43, the CPU 51 sets, for each of the speed change points identified at the above-described S42, a recommended speed at which the vehicle passes through the speed change point. For example, for an entrance to a parking lot having a sidewalk between an entry road and the parking lot, a mode in which first, the vehicle stops (0 m/s) and then passes through at a low speed (e.g., 3 m/s) is set as a recommended speed. On the other hand, for an entrance to a parking lot having no sidewalk between an entry road and the parking lot, a mode in which the vehicle passes through at a low speed (e.g., 3 m/s) is set as a recommended speed. In addition, for a railroad crossing or an intersection with a stop line, a mode in which first, the vehicle stops (0 m/s) and then passes through at a low speed (e.g., 3 m/s) is set as a recommended speed. In addition, for a curve or an intersection at which a left or right turn is to be made, a speed at which lateral acceleration (lateral G) occurring in the vehicle does not interfere with autonomous driving assistance and does not exceed an upper limit value (e.g., 0.2 G) at which a passenger of the vehicle is not given discomfort is set as a recommended speed. For example, calculation is performed based on the curvature of a curve, the configuration of an intersection, etc.

Then, at S44, the CPU 51 sets, for a segment that does not correspond to the speed change points identified at the above-described S42 (a segment between the speed change points), a speed limit set for a road or a passage in the segment as a recommended speed of the vehicle that travels on the segment, based on the speed limit information obtained at the above-described S41. Note, however, that for a road with a narrow road width, a road with poor visibility, a road with heavy traffic, a road with a high traffic accident rate, etc., a speed lower than a speed limit may be set as a recommended speed.

Thereafter, at S45, the CPU 51 generates, as a speed plan for the vehicle, data representing a transition in recommended speed in a traveling direction of the vehicle by combining together the recommended speeds for the speed change points set at the above-described S43 and the recommended speeds for locations other than the speed change points set at the above-described S44. In addition, upon creating a speed plan, the speed plan is modified as appropriate such that a speed change between speed change points satisfies a predetermined condition, more specifically, such that a condition that each of acceleration and deceleration of the vehicle traveling along the static travel path is less than or equal to a threshold value is satisfied.

Figure 23:
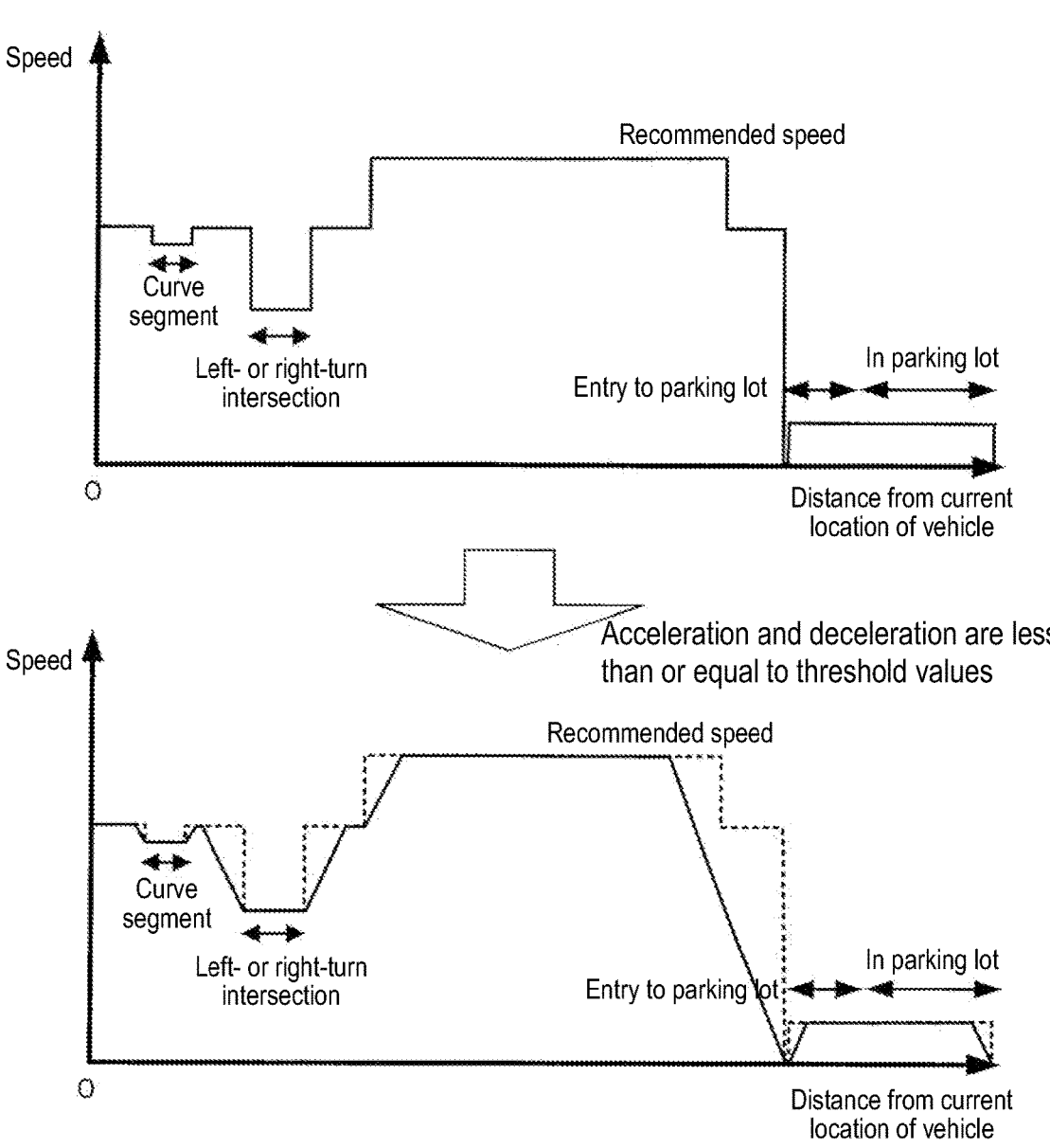
FIG. 23 is a diagram showing an example of a speed plan.

Here, FIG. 23 is a diagram showing an example of the speed plan for the vehicle created at the above-described S45. As shown in FIG. 23, in the speed plan, recommended speeds for locations other than speed change points are basically speed limits set for roads. On the other hand, for speed change points such as an entrance to a parking lot and an intersection, a speed lower than a speed limit is set as a recommended speed. Furthermore, the recommended speeds are modified so as to satisfy a condition that each of acceleration and deceleration of the vehicle traveling along a static travel path is less than or equal to a threshold value. Note, however, that the recommended speeds are basically modified only in a reduction way, and the recommended speeds are modified not to be reduced as much as possible in a range in which the condition is satisfied. In addition, the threshold values of acceleration and deceleration are the upper limit values of acceleration and deceleration that do not interfere with travel of the vehicle or autonomous driving assistance and that do not give a passenger of the vehicle discomfort. The threshold value of acceleration and the threshold value of deceleration may have different values. As a result, the recommended speeds are modified as shown in FIG. 23, by which a speed plan is created.

Then, the speed plan created at the above-described S45 is stored in the flash memory 54, etc., as assistance information used for autonomous driving assistance. In addition, an acceleration plan indicating acceleration and deceleration of the vehicle required to implement the speed plan created at the above-described S45 may also be created as assistance information used for autonomous driving assistance.

As described in detail above, a navigation device 1 and a computer program executed by the navigation device 1 according to the present embodiment obtain a lane network which is a network representing movement into lanes that can be selected by a vehicle, a parking network which is a network representing a course that can be selected by the vehicle in a parking lot, and an after-getting-out-of-vehicle network which is a network representing a course that can be selected by a user with moving means used after getting out of the vehicle (S22, S26, and S29), calculates, using the lane network, the parking network, and the after-getting-out-of-vehicle network, a moving cost required for movement to a destination, including movement by the vehicle to a parking space in the parking lot and movement from the parking space to the destination by the moving means used after getting out of the vehicle (S24, S28, and S31), and selects a parking space in which the vehicle is parked, using the calculated moving cost (S32), and thus, by taking into account also a user's burden associated with movement by the vehicle in addition to a user's burden associated with movement after getting out of the vehicle, an appropriate parking space for parking the vehicle can be selected. Then, by providing driving assistance based on the identified parking space, driving assistance can be appropriately provided.

In addition, a travel path is generated that is recommended for the vehicle to travel along from a travel start location of the vehicle to the selected parking space in accordance with a searched route with a minimum moving cost (S33 to S37), and driving assistance for the vehicle is provided based on the generated travel path (S10 and S11), and thus, a recommended travel path from a travel start point to a parking space that is where to park the vehicle can be identified. The generated travel path includes, in addition to a travel path to a parking lot in which the vehicle is parked, a travel path in the parking lot, and thus, appropriate assistance can be provided in travel of the vehicle until the vehicle is parked.

In addition, when the destination is a tenant in a facility including a plurality of tenants, a moving cost is calculated that is required for movement to the destination, including movement by the vehicle to a parking space in a parking lot and movement from the parking space to the tenant which is the destination present in the facility by the moving means used after getting out of the vehicle, and thus, particularly, when the destination is a specific tenant in a facility, an appropriate parking space for parking the vehicle can be selected taking into account also a user's burden associated with user's movement in the facility.

In addition, using location information of the parking space in the parking lot, location information of an entrance to the facility including the tenant which is the destination, and location information of the tenant which is the destination present in the facility, a moving cost is calculated that is required for movement to the destination, including movement by the vehicle to the parking space in the parking lot and movement from the parking space to the tenant which is the destination present in the facility by the moving means used after getting out of the vehicle, and thus, an appropriate parking space for parking the vehicle can be selected taking into account also a user's burden associated with user's movement in the facility.

In addition, a higher moving cost is calculated for longer time required for movement (S24, S28, and S31), and thus, a user's burden associated with a plurality of completely different types of movement, such as movement by the vehicle on a public road, movement by the vehicle in a parking lot, and movement on foot after getting out of the vehicle, can be appropriately evaluated with one evaluation criterion.

In addition, in the after-getting-out-of-vehicle network, a section line of a parking space provided in the parking lot is included in the course that can be selected by the user with the moving means used after getting out of the vehicle, and thus, a course along which the user may move in the parking lot can be appropriately grasped based on information about the parking lot.

Note that the present disclosure is not limited to the above-described embodiment, and it is, of course, possible to make various modifications and alterations thereto without departing from the spirit and scope of the present disclosure.

For example, in the present embodiment, when a recommended travel path is searched using a network, first, narrowing down to a plurality of candidate courses is performed (S2), and a comparison is made between costs of lane networks constructed for the respective candidate courses, to identify a route with a minimum cost (S32), but without narrowing down candidate courses, lane networks may be constructed targeting all courses around the vehicle, and a route with a minimum cost may be searched and identified.

In addition, in the present embodiment, a case in which a travel start point of the vehicle is on a road is assumed, but the present invention can also be applied to a case in which the travel start point is in a parking lot. In that case, a travel path recommended for the vehicle to travel along from the travel start point to an exit of the parking lot and a travel path recommended for the vehicle to travel along from the exit of the parking lot to a road facing the exit of the parking lot are also calculated. The travel path recommended for the vehicle to travel along from the travel start point to an exit of the parking lot is calculated using a parking network of the parking lot in which the travel start point is present, and the travel path recommended for the vehicle to travel along from the exit of the parking lot to a road facing the exit of the parking lot is calculated using connection information 18 and outside-the-road configuration information 19, as with a path for a case of entering the parking lot (S35 and FIG. 20). In addition, in that case, the connection information 18 includes information indicating a connection relationship between a lane included in the road facing the exit of the parking lot and the exit of the parking lot.

In addition, in the present embodiment, a static travel path is generated that includes a first travel path recommended for the vehicle to travel along in lanes from a travel start point to an entry road facing an entrance to a parking lot, a second travel path recommended for the vehicle to travel along from the entry road to the entrance to the parking lot, and a third travel path recommended for the vehicle to travel along from the entrance to the parking lot to a parking space in which the vehicle is parked, but the static travel path may include only the first travel path and the second travel path. Namely, only the first travel path and the second travel path may be paths to be generated.

In addition, in the present embodiment, of a plurality of parking spaces provided in a parking lot, a specific parking space in which the vehicle is parked is identified, but a wider area may be identified. For example, when a parking lot includes a plurality of areas, an area in which the vehicle is parked may be identified. In addition, when there are a plurality of parking lots as candidates for parking, a parking lot may be identified.

In addition, in the present embodiment, a static travel path that is finally generated is information that identifies a specific path (a set of coordinates or a line) along which the vehicle travels, but such a level of information that does not identify a specific path but can identify roads and lanes where the vehicle is to travel may be obtained. Namely, a route of a network with a minimum lane cost identified at S32 (a way of moving into lanes indicating how the vehicle moves into lanes) may be used as a static travel path, and the processes at and after S33 may not be performed. In addition, instead of identifying a specific travel path, only roads on which the vehicle travels and a parking space in which the vehicle is parked in a parking lot may be identified.

In addition, in the present embodiment, upon generating a static travel path, a lane network, a parking network, and an after-getting-out-of-vehicle network are generated using highly accurate map information 16 and facility information 17 (S22, S26, and S29), but each network that targets roads and parking lots across the country may be stored in advance in a DB, and the networks may be read from the DB as necessary.

In addition, in the present embodiment, highly accurate map information provided in the server device 4 includes both information about the lane configurations of roads (lane-by-lane road configurations, curvatures, lane widths, etc.) and information about section lines (roadway center-lines, lane boundary lines, roadway outer lines, guidelines, etc.) painted on the roads, but may include only the information about section lines or may include only the information about the lane configurations of roads. For example, even when only the information about section lines is included, it is possible to estimate information corresponding to the information about the lane configurations of roads, based on the information about section lines. In addition, even when only the information about the lane configurations of roads is included, it is possible to estimate information corresponding to the information about section lines, based on the information about the lane configurations of roads. In addition, the "information about section lines" may be information that identifies the types or layout of section lines themselves that mark off lanes, or may be information that identifies whether a lane change can be made between adjacent lanes, or may be information that directly or indirectly identifies the configurations of lanes.

In addition, in the present embodiment, as means for reflecting a dynamic travel path in a static travel path, a part of the static travel path is replaced by the dynamic travel path (S8), but instead of replacement, the static travel path may be modified to approximate to the dynamic travel path.

In addition, in the present embodiment, control, by the vehicle control ECU 40, of all of an accelerator operation, a brake operation, and a steering wheel operation which are operations related to the behavior of the vehicle among vehicle operations is described as autonomous driving assistance for performing autonomous travel independently of user's driving operations. However, the autonomous driving assistance may indicate control, by the vehicle control ECU 40, of at least one of an accelerator operation, a brake operation, and a steering wheel operation which are operations related to the behavior of the vehicle among vehicle operations. On the other hand, it is described that manual driving by user's driving operations indicates performing, by the user, of all of an accelerator operation, a brake operation, and a steering wheel operation which are operations related to the behavior of the vehicle among vehicle operations.

In addition, driving assistance of the present disclosure is not limited to autonomous driving assistance related to autonomous driving of the vehicle. For example, it is also possible to provide driving assistance by displaying a static travel path identified at the above-described S4 and a dynamic travel path generated at the above-described S7 on a navigation screen and providing guidance using voice, a screen, etc. (e.g., guidance on a lane change or guidance on a recommended vehicle speed). In addition, user's driving operations may be assisted by displaying a static travel path and a dynamic travel path on a navigation screen.

In addition, although, in the present embodiment, the configuration is such that the autonomous driving assistance program (FIG. 4) is executed by the navigation device 1, the configuration may be such that an in-vehicle device other than the navigation device 1 or the vehicle control ECU 40 executes the autonomous driving assistance program. In that case, the in-vehicle device or the vehicle control ECU 40 is configured to obtain a current location of the vehicle, map information, etc., from the navigation device 1 or the server device 4. Furthermore, the server device 4 may perform some or all of the steps of the autonomous driving assistance program (FIG. 4). In that case, the server device 4 corresponds to a driving assistance device of the present application.

In addition, the present disclosure can also be applied to mobile phones, smartphones, tablet terminals, personal computers, etc. (hereinafter, referred to as portable terminals, etc.) in addition to navigation devices. In addition, the present disclosure can also be applied to a system including a server and a portable terminal, etc. In that case, the configuration may be such that each step of the above-described autonomous driving assistance program (see FIG. 4) is performed by either one of the server and the portable terminal, etc. Note, however, that when the present disclosure is applied to a portable terminal, etc., a vehicle that can provide autonomous driving assistance and the portable terminal, etc. need to be connected to each other in a communicatable manner (it does not matter whether it is a wired or wireless connection).

REFERENCE SIGNS LIST

1: Navigation device, 2: Driving assistance system, 3: Information delivery center, 4: Server device, 5: Vehicle, 16: Highly accurate map information, 17: Facility information, 18: Connection information, 19: Outside-the-road configuration information, 33: Navigation ECU, 40: Vehicle control ECU, 51: CPU, 73: Walk node, 74: Walk link, 75: Parking space, 76: Parking lot node, 77: Parking lot link, 83: Parking lot, 85: Lane node, 86: Lane link, and 88: Entry road

The invention claimed is:

1. A driving assistance device comprising:
lane network obtaining means for obtaining a lane network, the lane network being a network representing movement into lanes that are available to be selected by a vehicle;
parking network obtaining means for obtaining a parking network, the parking network being a network representing a course that is available to be selected by a vehicle in a parking lot;
after-getting-out-of-vehicle network obtaining means for obtaining an after-getting-out-of-vehicle network, the after-getting-out-of-vehicle network being a network representing a course at least within a parking lot that is available to be selected by a user with moving means used after getting out of a vehicle, the after-getting-out-of-vehicle network includes walking nodes and walking links connecting nodes for areas passable by pedestrians between the walking nodes and the areas passable by pedestrians includes passages passable by vehicles, passages only passable by pedestrians and passages including boundary lines of parking spaces, the walking nodes and walking links construct the after-getting-out-of-vehicle network;
cost calculating means for calculating, using the lane network, the parking network, and the after-getting-out-of-vehicle network, a moving cost required for movement to a destination, including movement by a vehicle to a parking space in a parking lot and movement from a parking space to a destination by moving means used after getting out of a vehicle, the moving cost for each walking link based on a length, a configuration and a type of the area passage being traversed on each walking link;
parking space selecting means for selecting a parking space in which a vehicle is parked, using the moving cost calculated by the cost calculating means; and
travel path generating means for generating a travel path recommended for a vehicle to travel along from a travel start location of a vehicle to a parking space selected by the parking space selecting means, in accordance with a route with a minimum moving cost searched by the parking space selecting means; and
an automated driving controller to provide autonomous control of a vehicle based on the travel path.

2. The driving assistance device according to claim 1, wherein
when a destination is a tenant in a facility including a plurality of tenants,
the cost calculating means calculates a moving cost required for movement to a destination, including movement by a vehicle to a parking space in a parking lot and movement from a parking space to a tenant that is a destination present in a facility by moving means used after getting out of a vehicle.

3. The driving assistance device according to claim 2, wherein the cost calculating means calculates a moving cost required for movement to a destination, using location information of a parking space in a parking lot, location information of an entrance to a facility including a tenant that is a destination, and location information of a tenant that is a destination present in a facility, the movement including movement by a vehicle to a parking space in a parking lot and movement from a parking space to a tenant that is a destination present in a facility by moving means used after getting out of a vehicle.

4. The driving assistance device according to claim 1, wherein the cost calculating means calculates a higher moving cost for longer time required for movement.

5. The driving assistance device according to claim 1, wherein in the after-getting-out-of-vehicle network, a section line of a parking space provided in a parking lot is included in a course that that is available to be selected by a user with moving means used after getting out of a vehicle.

6. A non-transitory computer readable medium storing a computer program for causing a computer to function as:

lane network obtaining means for obtaining a lane network, the lane network being a network representing movement into lanes that are available to be selected by a vehicle;

parking network obtaining means for obtaining a parking network, the parking network being a network representing a course that is available to be selected by a vehicle in a parking lot;

after-getting-out-of-vehicle network obtaining means for obtaining an after-getting-out-of-vehicle network, the after-getting-out-of-vehicle network being a network representing a course at least within a parking lot that is available to be selected by a user with moving means used after getting out of a vehicle, the after-getting-out-of-vehicle network includes walking nodes and walking links connecting nodes for areas passable by pedestrians between the walking nodes and the areas passable by pedestrians includes passages passable by vehicles, passages only passable by pedestrians and passages including boundary lines of parking spaces, the walking nodes and walking links construct the after-getting-out-of-vehicle network;

cost calculating means for calculating, using the lane network, the parking network, and the after-getting-out-of-vehicle network, a moving cost required for movement to a destination, including movement by a vehicle to a parking space in a parking lot and movement from a parking space to a destination by moving means used after getting out of a vehicle, the moving cost for each walking link based on a length, a configuration and a type of the area passage being traversed on each walking link;

parking space selecting means for selecting a parking space in which a vehicle is parked, using the moving cost calculated by the cost calculating means; and travel path generating means for generating a travel path recommended for a vehicle to travel along from a travel start location of a vehicle to a parking space selected by the parking space selecting means, in accordance with a route with a minimum moving cost searched by the parking space selecting means; and an automated driving control unit to provide autonomous control of a vehicle, based on the travel path.

* * * * *